United States Patent
Ichimura et al.

(10) Patent No.: US 7,550,695 B2
(45) Date of Patent: Jun. 23, 2009

(54) METHOD FOR MANUFACTURING A MAGNETIC DISK DEVICE WITH IMPROVED HEAD GIMBAL ASSEMBLY

(75) Inventors: Yohtaroh Ichimura, Kanagawa (JP); Kohichiroh Naka, Kanagawa (JP); Yoshio Uematsu, Kanagawa (JP); Tatsushi Yoshida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 832 days.

(21) Appl. No.: 11/228,670

(22) Filed: Sep. 15, 2005

(65) Prior Publication Data

US 2006/0053621 A1  Mar. 16, 2006

(30) Foreign Application Priority Data

Sep. 15, 2004  (JP) ............................. 2004-267719

(51) Int. Cl.
  *B23K 26/00* (2006.01)
  *G11B 5/48* (2006.01)
(52) U.S. Cl. .............................. 219/121.85; 360/245.7
(58) Field of Classification Search . 219/121.6–121.85; 360/245–245.9
See application file for complete search history.

(56) References Cited

U.S. PATENT DOCUMENTS 5,381,359 A * 1/1995 Abbott et al. ............... 708/322
6,535,355 B2 * 3/2003 Boutaghou et al. ......... 360/245.7
6,624,963 B2 * 9/2003 Szita ........................ 360/77.08
6,751,042 B2 * 6/2004 Bi et al. .................... 360/77.02
6,798,613 B1 * 9/2004 Krajnovich et al. ........ 360/97.01
7,152,303 B2 * 12/2006 Childers et al. ........... 29/603.06

FOREIGN PATENT DOCUMENTS

JP     01-227279     9/1989
JP     2000-339894   12/2000
JP     2002-074630   3/2002

* cited by examiner

*Primary Examiner*—Sang Y Paik
(74) *Attorney, Agent, or Firm*—Townsend and Townsend and Crew LLP; John Henkhaus

(57) ABSTRACT

Embodiments of the invention correct the static attitude of a head gimbal assembly (HGA) with high accuracy. In one embodiment, a vector group that constitutes the shortest path from the initial attitude of the HGA to the final anticipatory attitude is formed. The vector group is formed of the plural displacement vectors that give a variety of variations in static attitude when unit shots of laser light are performed on the HGA. Displacement vectors are synthesized while the displacement vectors each giving the anticipatory attitude closest to a target attitude are being selected in order from the initial attitude, toward the target attitude. Unit shots equivalent to the number of displacement vectors are performed on irradiating positions related to the displacement vectors included in the vector group. The static attitude existing after the unit shots is measured, then the displacement vectors are corrected, and a vector group constituting the new shortest path is formed. Highly accurate attitude correction is thus realized.

20 Claims, 16 Drawing Sheets

(A)

(B)

Fig. 6
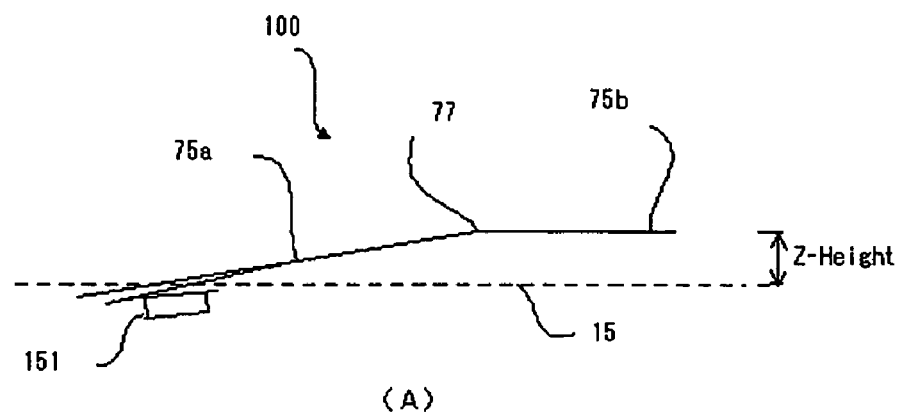
(A)
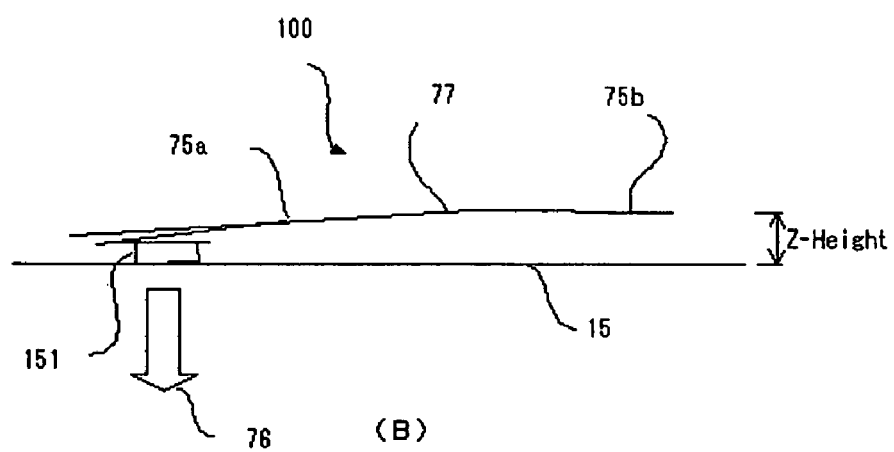
(B)
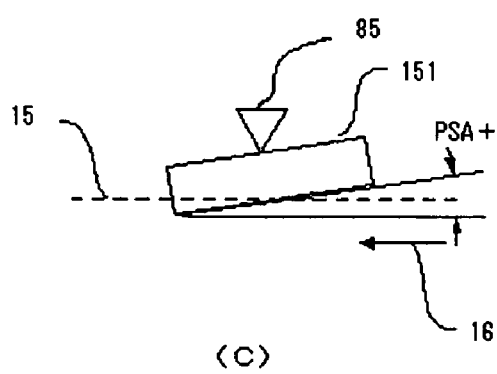
(C)
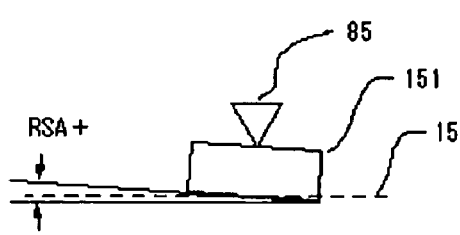
(D)

Fig. 9
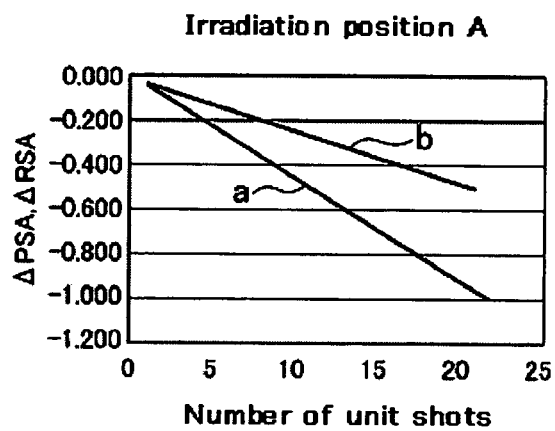
(A)
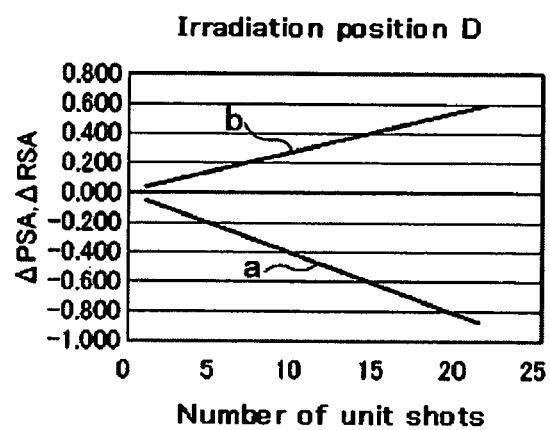
(D)
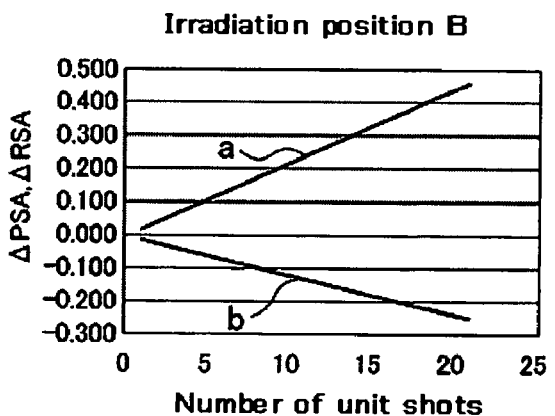
(B)
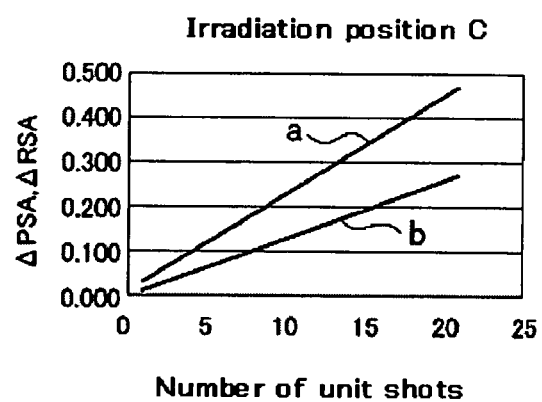
(C)

Fig. 11
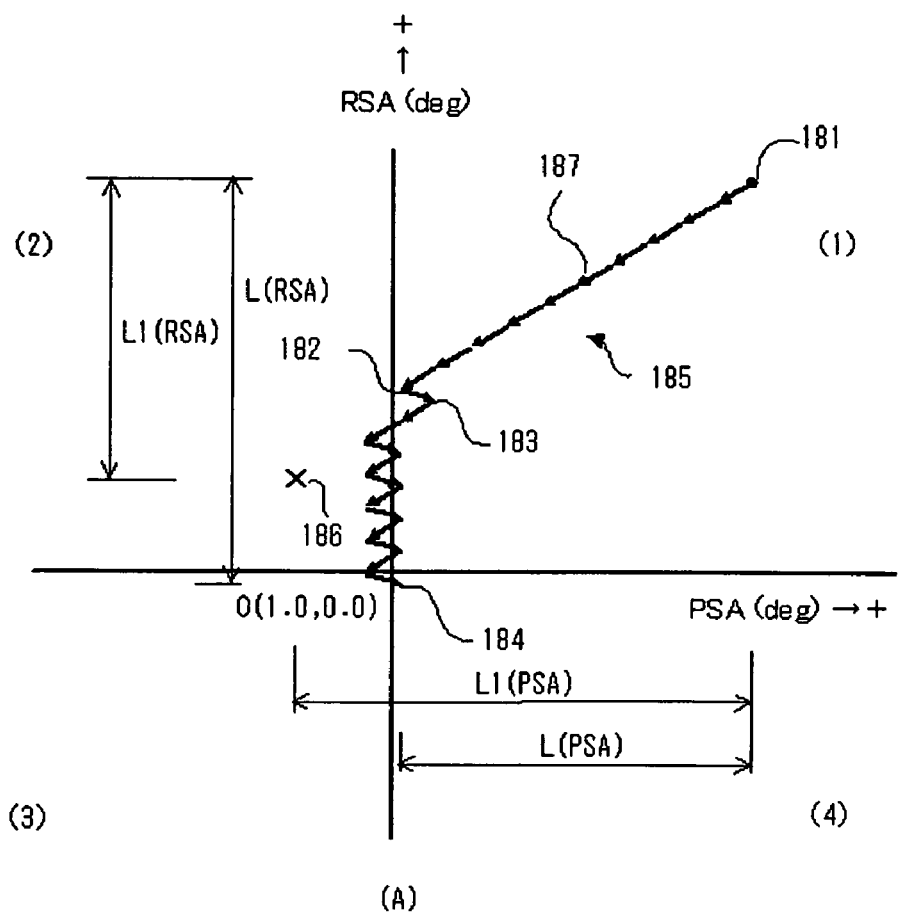
(A)
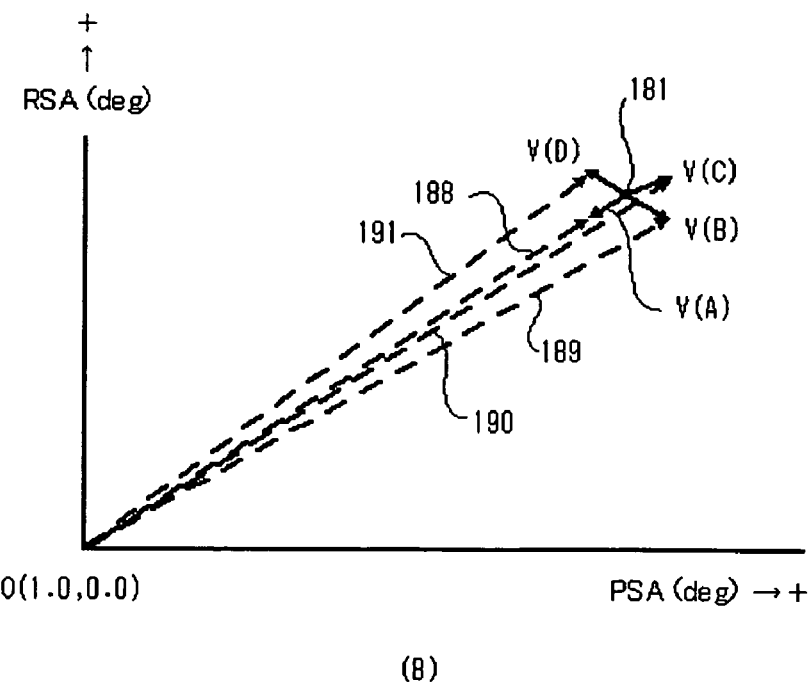
(B)

| Irradiation position | PSA | RSA |
|---|---|---|
| A | -0.047 | -0.024 |
| B | +0.022 | -0.012 |
| C | +0.022 | +0.013 |
| D | -0.043 | +0.028 |

METHOD FOR MANUFACTURING A MAGNETIC DISK DEVICE WITH IMPROVED HEAD GIMBAL ASSEMBLY

CROSS-REFERENCES TO RELATED APPLICATIONS

This application claims priority from Japanese Patent Application No. JP2004-267719, filed Sep. 15, 2004, the entire disclosure of which is incorporated herein by reference.

BACKGROUND OF THE INVENTION

The present invention relates to a method of manufacturing a magnetic disk device, and more particularly, to a method of manufacturing a magnetic disk device having a head gimbal assembly excellent in moving performance.

The head/slider installed on the suspension assembly of a magnetic disk device moves to the required track while flying slightly over the surface of the magnetic disk since its air-bearing surface is assigned lifting force from the air stream generated on the surface of a magnetic disk which rotates. In order for the head/slider to have sufficient moving performance to always maintain in the required range the spacing between the head and the magnetic disk surface, it is an important factor that the static attitude of the head/slider with respect to the magnetic disk surface before the head/slider starts to fly should be as close as possible to an ideal value. In general, the static attitude of the head/slider is defined by a static roll angle or roll static attitude (RSA) that is the angle of rotation around the longitudinal axis of the suspension assembly, and a static pitch angle or pitch static attitude (PSA) that is the angle of rotation around an axis vertical to the longitudinal axis of the suspension assembly after the head/slider has moved past a dimple contact point (DCP). A conventional method of correcting PSA and RSA to bring the static attitude closer to an ideal one has been by applying mechanical bending or twisting force to a head gimbal assembly (HGA) with a head/slider installed on a suspension assembly. A method of correcting PSA and RSA by irradiating laser light has also been proposed.

Patent Document 1 (Japanese Patent Laid-Open No. 2002-74630) discloses a system for controlling the attitude of a suspension by irradiating laser light. In the invention of Patent Document 1, a line number, a line starting point, a line angle, laser intensity, a shot time interval, and the number of shots are assigned as conditions to various linear-correction lines and then the pitching angles and rolling angles obtained when samples actually suffer deformation when irradiated with laser light in various combinations of the conditions are measured to create a linear correction table. After the creation of the table, the attitude of the suspension is corrected during an actual workpiece correction phase by irradiating light in accordance with a correction recipe created by sequentially searching the linear correction table for the correction line that forms the angle closest to a target angle after correction from such a measuring angle as shown in FIG. 12 of Patent Document 1.

Patent Document 2 (Japanese Patent Laid-Open No. 2004-82161) discloses a technology for irradiating the required laser shot regions with laser light of the required length and shape and bending both the section of a suspension that is to be subjected to load-bending, and the section to be adjusted in angle. In the invention of Patent Document 2, the relationship between the irradiation of the laser light and the displacement of the section to be subjected to load-bending is acquired experimentally or by simulation in order to acquire the amounts of thermal deformation due to the laser light beforehand for each laser shot region. Irradiation patterns of the laser light are registered in a database as the shot characters showing a more specific example of the above relationship.

BRIEF SUMMARY OF THE INVENTION

In recent years, as recording density improved, the flying heights of heads/sliders have further decreased and the accuracy of static attitude, required of head gimbal assemblies, is becoming more stringent to maintain the flying height of the head. With the conventional methods of mechanical correction or of correction by laser light irradiation, therefore, it has become difficult to satisfy the need of more accurate static attitude. Also, to realize mass production, a correction method as simple and accurate as possible is being desired.

Accordingly, a feature of the present invention is to provide a method of manufacturing a magnetic disk device having an HGA excellent in moving performance. Another feature of the present invention is to provide a method of manufacturing a magnetic disk device which can correct the static attitude of an HGA to an ideal value by use of a simplified method and with high accuracy.

The present invention is concerned with a method of manufacturing a magnetic disk device which includes a magnetic disk, an HGA with a head/slider mounted thereon for accessing the magnetic disk, and a carriage rotatably supporting the HGA, and the invention features a technology for correcting the static attitude of the HGA. When the static attitude is defined by PSA and RSA, the amounts of displacement of PSA and RSA due to unit shots of laser light with respect to each of the plural irradiating positions set for the HGA are given as displacement vector components. The amounts of displacement of PSA and RSA due to unit shots are linear in the range of the number of shots required for attitude correction, and the displacement of static attitude due to unit shots of laser light can be estimated by synthesizing a plurality of displacement vectors.

Even if the initial attitude of the HGA (i.e., the as-assembled static attitude of the HGA) stays within its manufacturing tolerance range, the initial attitude needs to be corrected to a value close to the target attitude that is an ideal static attitude. It is desirable that the total number of unit shots with respect to each irradiating position should be minimized. This is due to the fact that since the correction time required is reduced, production volumes can be increased and thus the HGA is prevented from being applied a thermal stress greater than necessary and correspondingly improves in quality. The number of unit shots with respect to each irradiating position is therefore determined to minimize the total number of shots. In order to minimize the total number of shots, the vector group constituting the shortest path from the initial attitude to the permissible range of the target attitude is formed by synthesizing a plurality of displacement vectors.

A displacement vector usually has PSA components and RSA components of a certain value, and unit shots of laser light with respect to each irradiating position change the HGA in PSA and RSA at the same time. Also, the permissible range of the target attitude is set for both PSA and RSA. In order to form the vector group constituting the shortest path from the initial attitude to the target attitude, more than one anticipatory attitude according to the number of displacement vectors is calculated by synthesizing the initial attitude and each displacement vector, and either of the displacement vectors constituting the anticipatory attitude closest to the target attitude is selected. After this, more than one anticipatory attitude according to the number of displacement vectors is further calculated by synthesizing the ending point of the selected displacement vector and each displacement vector, and either of the displacement vectors constituting the anticipatory attitude closest to the target attitude is selected. This procedure is repeated for up to the final anticipatory attitude.

The vector group of the shortest path, as the synthesized displacement vectors, gives the number of unit shots with respect to each irradiating position, required for the correction of the initial attitude to the target attitude. A common displacement vector that is an average value of the plural displacement vectors which were obtained by actually measuring a plurality of HGAs of the same structure, is generally used as a displacement vector. When mass production is required, previously measuring the displacement vectors of the individual HGAs concerned with manufacture is not preferable since a decrease in production volume results from the measurement. Conversely, if the number of unit shots is calculated from the vectors of the shortest path that were formed without using the displacement vectors derived from data measurements on each HGA concerned with manufacture and then laser light is irradiated, since differences exist between the actual displacement of the HGA with respect to the unit shot and the displacement vectors constituting the vectors group, it may become difficult to correct the initial attitude to the permissible range of the target attitude.

In the present invention, when the after-shot attitude existing after laser light has been irradiated is not within a permissible range of a target attitude, displacement vectors are corrected from the relationship between the after-shot attitude with respect to an initial attitude and a first final anticipatory attitude. After the corrections, the corrected displacement vectors or the corrected displacement vectors and uncorrected displacement vectors are used to form a second vector group constituting the shortest path from the after-shot attitude to a second final anticipatory attitude within the permissible range of the target attitude. The second vector group includes the displacement vectors that were corrected using actual data of the laser light irradiation onto the HGA. Therefore, irradiation of laser light, based on the first vector group, improves the accuracy of the after-shot attitude with respect to the final anticipatory attitude.

In the present invention, there are two modes of timing in which the second vector group is to be obtained. In a first mode, the shortest path up to a first final anticipatory attitude within a permissible range of a target attitude is formed using a first vector group obtained by synthesizing only uncorrected displacement vectors, the number of shots with respect to each irradiating position is calculated, and laser light is actually irradiated. If the attitude existing after the laser light has been irradiated does not fall within the permissible range, displacement vectors are corrected on the basis of the final anticipatory attitude and the after-shot attitude. After the corrections, the shortest path from the after-shot attitude to a second final anticipatory attitude within the permissible range of the target attitude is formed using a second vector group including at least the corrected displacement vectors.

In a second mode, the shortest path up to an intermediate anticipatory attitude is formed using a first vector group including only a required number of uncorrected displacement vectors, the number of shots with respect to each irradiating position is calculated, and laser light is actually irradiated. If the attitude existing after the laser light has been irradiated does not fall within a permissible range, displacement vectors are corrected on the basis of the intermediate anticipatory attitude and the after-shot attitude. After the corrections, the shortest path from the after-shot attitude to a second final anticipatory attitude within the permissible range of a target attitude is formed using a second vector group including at least the corrected displacement vectors. The intermediate anticipatory attitude is determined by previously setting the number of displacement vectors ranging from the initial attitude to the intermediate anticipatory attitude.

In the first mode, since the first vector group is formed so that the first final anticipatory attitude falls within the permissible range of the target attitude, the first shot of laser light is likely to make the after-shot attitude fall within the permissible range of the target attitude. Even if the first shot does not make the after-shot attitude fall within the permissible range, the accuracy of the after-shot attitude with respect to the second final anticipatory attitude improves since the next shot of laser light is conducted on the basis of the corrected displacement vectors.

In the second mode, the intermediate anticipatory attitude can be set to an arbitrary position by setting the number of uncorrected displacement vectors. The second mode is the same as the first mode in that a difference occurs between the after-shot attitude and the intermediate anticipatory attitude. However, since the second vector group constituting the shortest path from the intermediate anticipatory attitude to the final anticipatory attitude includes the corrected displacement vectors, conducting irradiation under the irradiation conditions that have been calculated from the second vector group improves the accuracy of the after-shot attitude during that zone. This indicates that if the position of the intermediate anticipatory attitude is set so that the length of the shortest path formed using the corrected displacement vectors ranging from the intermediate anticipatory attitude to the final anticipatory attitude is greater than that of the shortest path formed in the first mode, the total number of shots for attitude correction can be reduced in comparison with the case where the second vector group is formed in the first mode.

The present invention has made it possible to provide a method of manufacturing a magnetic disk device having a head gimbal assembly excellent in moving performance. The invention has also made it possible to provide a method of manufacturing a magnetic disk device which can correct the static attitude of an HGA to an ideal value by use of a simplified method and with high accuracy.

BRIEF DESCRIPTION OF THE DRAWINGS

FIGS. 6(A) through 6(D) are diagrams explaining a static attitude of the head gimbal assembly.

FIGS. 9(A) through 9(D) show measured data on laser doses at each irradiating position and on changes in the static attitude of the head gimbal assembly.

FIGS. 11(A) and 11(B) are diagrams each explaining the vector group formed to construct the shortest path.

FIG. 12 is a part of a flowchart explaining another method of correcting the static attitude of the head gimbal assembly.

DETAILED DESCRIPTION OF THE INVENTION

Figure 1:
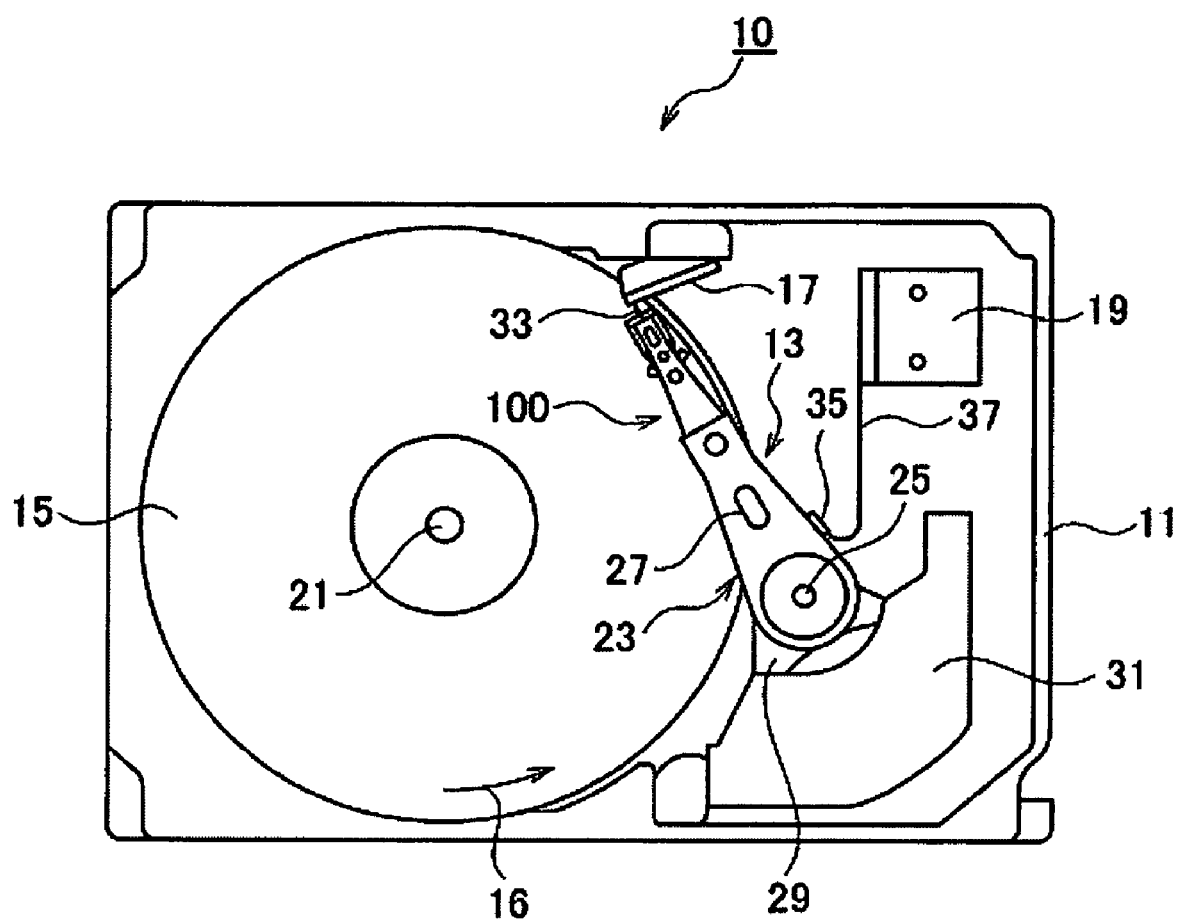
FIG. 1 is a plan view showing a schematic configuration of a magnetic disk device according to an embodiment of the present invention.

FIG. 1 is a plan view showing a schematic configuration of a magnetic disk device 10 according to an embodiment of the present invention. A base 11 holds a head stack assembly (HSA) 13, a magnetic disk 15, a ramp 17, a connector 19, and other elements, and is formed in an enclosed space integrally with a base cover (not shown). The magnetic disk 15 is fixed to a spindle hub (not shown) in the condition where one or more disks are stacked, and rotates about a spindle 21 in a direction of an arrow 16 by means of a spindle motor (not shown) provided at bottom. A magnetic layer for recording data is formed on at least one of the surfaces of each disk constituting the magnetic disk 15.

The HSA 13 has a carriage 23 and an HGA 100, and rotationally moves about a pivot 25 by means of a voice coil motor (VCM). The carriage 23 includes an actuator arm 27 for installing the HGA 100, and a coil support 29 for supporting voice coils (not shown). A voice coil yoke 31 is installed on the base 11 so as to shroud the coil support 29 and the voice coils. A voice coil magnet (not shown) that is a permanent magnet is installed on a reverse side of the voice coil yoke 31. The voice coils, the voice coil magnet, and the voice coil yoke 31 are constituent elements of the VCM.

The magnetic disk device 10 according to the present embodiment of the present invention has a merge lip 33 at a front end of the HGA 100, thus realizing the so-called "loading/unloading scheme" in which the HGA retracts a head/slider (described later) from the surface of the magnetic disk 15 by sliding the merge lip 33 to a retraction surface of the ramp 17 before the magnetic disk stops rotating. The present invention, however, is not limited to/by a manufacturing method for magnetic disk devices of the loading/unloading scheme, and is also applicable to magnetic disk devices of a contact start-stop scheme.

The HGA 100 and the actuator arm 27 are configured into a stacked structure so as to respond to each of recording surfaces of the magnetic disk 15. The carriage 23 also has a relay terminal 35 and conducts a connection between traced wiring (not shown) connected to a head at one end, and a flexible printed-circuit (FPC) board 37 connected to the connector 19 at one end.

Figure 2:
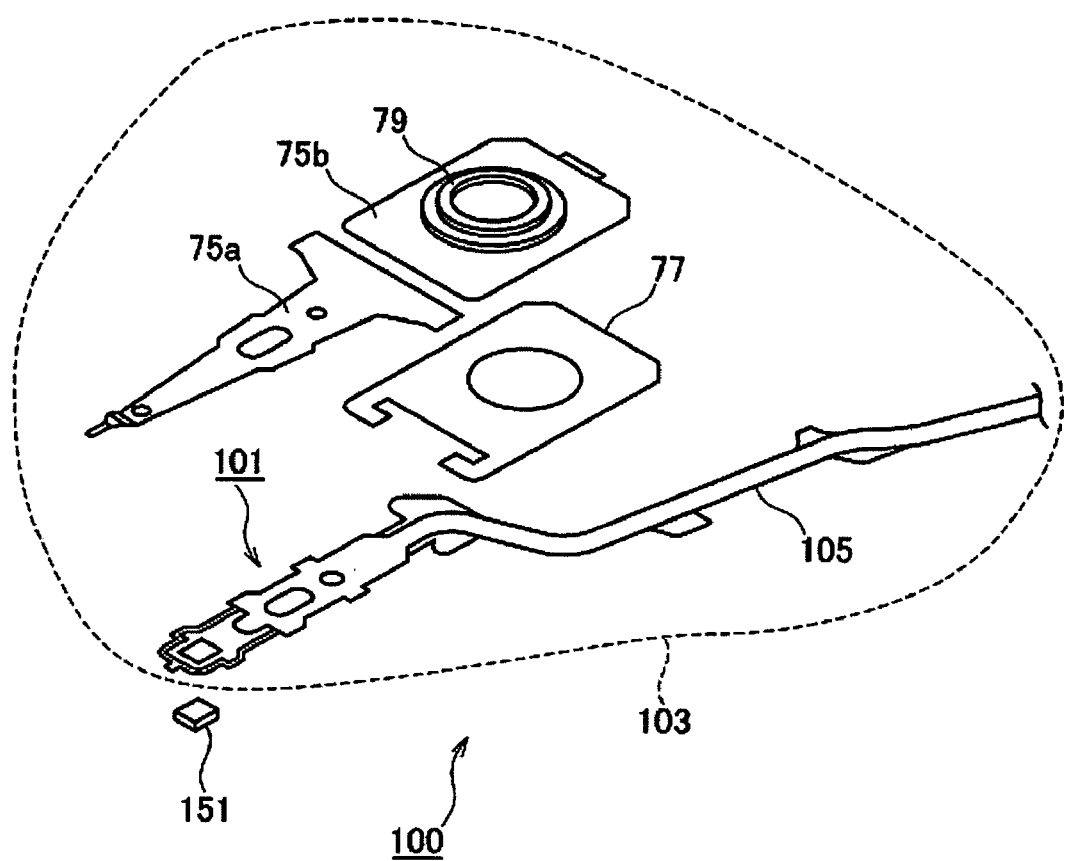
FIG. 2 is a perspective view explaining a configuration of a head gimbal assembly according to the present embodiment of the present invention.

FIG. 2 is a perspective view explaining a configuration of the HGA 100 according to the present embodiment of the present invention. In FIG. 2, a mount plate 79, an arm 75a of a two-piece load beam, and a fixed portion 75b thereof, a hinge 77, and a flexure assembly 101 constitute a suspension assembly 103. The suspension assembly 103 further has a head/slider 151 installed to form the HGA 100. An air-bearing surface (ABS) geometrically characterized for obtaining appropriate lifting force is formed on the surface of the head/slider 151 that faces the magnetic disk 15. The fixed portion 75b of the load beam is fixed to the actuator arm 27 of the carriage 23 by swage-machining the mount plate 79.

The hinge 77 couples the arm 75a and fixed portion 75b of the load beam and takes a spring structure so that when the magnetic disk 15 and the HSA 13 are installed on the base 11, a pressing load extending to the surface of the magnetic disk 15 is applied to the arm 75a of the load beam. The flexure assembly 101 is fixed to the arm 75a, and the head/slider 151 installed at the bottom of the flexure assembly 101 conducts a pivoting motion or gimbal motion when the ABS undergoes an air stream. The flexure assembly 101 employs a structure integrated with wiring, and has a wiring pattern 105.

The flexure assembly 101 of the structure integrated with wiring is formed by being stacked with a metal layer which constitutes the spring structure supporting the head/slider 151, a conductor layer which constitutes the wiring pattern, and an insulator layer which insulates the metal layer and the conductor layer. The surface of the conductor layer may further have a covering layer or be provided with plating treatment, as appropriate, to prevent corrosion. Wiring-integrated flexure assemblies having such a stacked structure are divided into three types according to particular differences in manufacturing method: an additive type, a subtractive type, and a flexible board type.

The additive type is applied to a method of piling each layer in order using photolithography. The subtractive type is applied to a method of forming a required structure by etching a sheet preformed with a metal layer, an insulator layer, a conductor layer, and a covering layer or the like. The flexible board type is used in a method of affixing, onto the surface of a metal layer, a flexible printed-circuit board formed with an insulator layer, a conductor layer, and a covering layer or the like into a required shape. Although the flexure assembly 101 according to the present embodiment is of the additive type, the present invention can also be applied to any of the three types of wiring-integrated flexure assemblies. The present invention is further applicable to not only wiring-integrated flexure assemblies, but also suspension assemblies of the form where a flexure and lead wires are separated. The wiring pattern 105 is formed up of an insulator layer, a conductor layer, and a covering layer, one end of the conductor layer being connected to a slider pad (not shown) formed on the head/slider 151, and the other end of the conductor layer being connected to the FPC 37 via the relay terminal 35.

Figure 3:
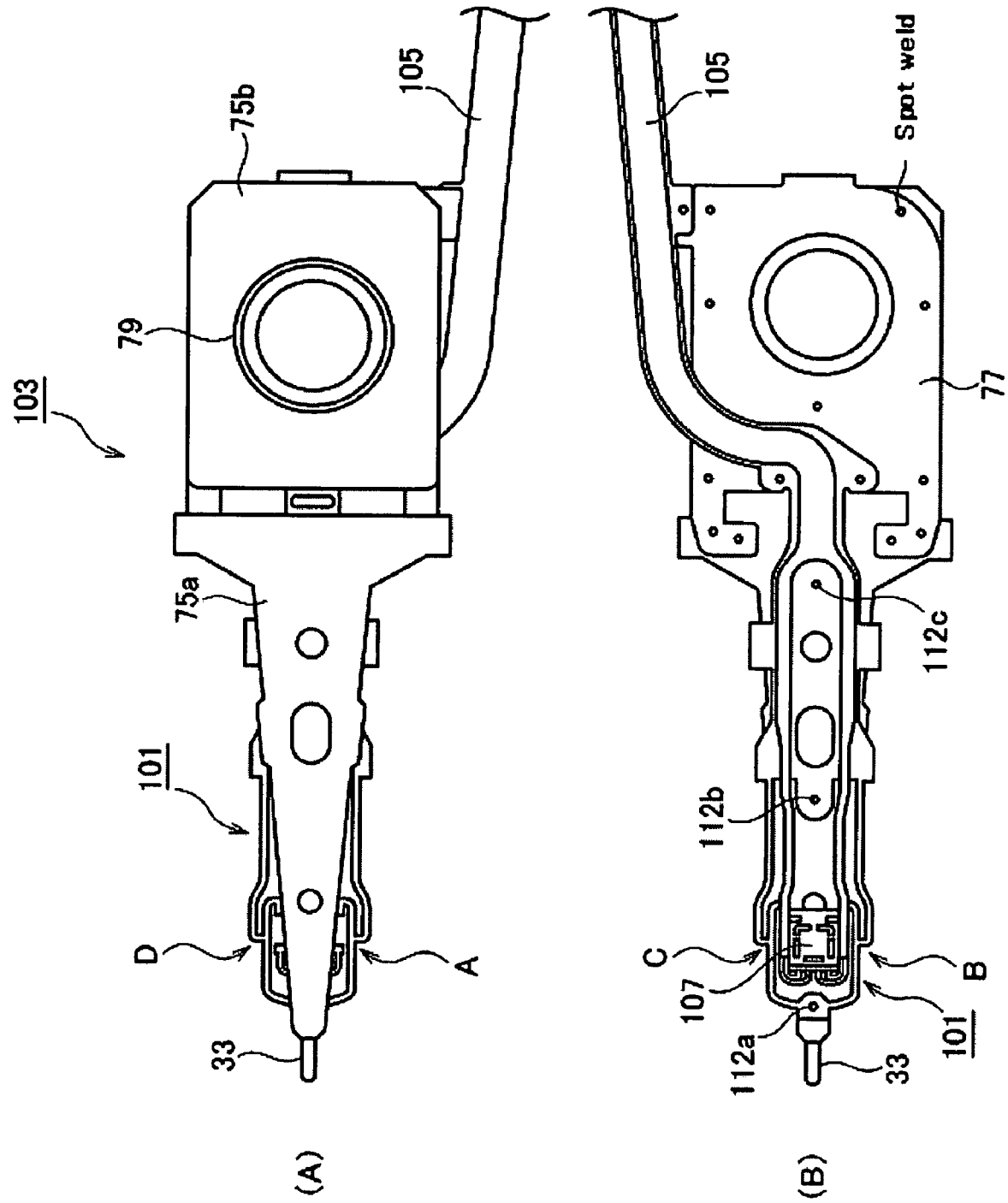
FIGS. 3(A) and 3(B) are diagrams explaining a structure of a suspension assembly.

FIGS. 3(A) and 3(B) are diagrams explaining a structure of the suspension assembly 103. FIG. 3(A) is an enlarged plan view of the suspension assembly 103 of FIG. 2 from the load beam side. FIG. 3(B) is a plan view of the head/slider 151 when seen from an installation side thereof. A plurality of welding spots indicating the spot-welding positions provided on the flexure assembly 101 and the hinge 77 in order to assemble the suspension assembly 103 are also shown in FIG. 3(B). In addition, a flexure tongue 107 at which the head/slider 151 is installed is shown in FIG. 3(B).

The flexure assembly 101 is fixed to the arm 75a of the load beam, at three welding spots, 112a, 112b, 112c, and the flexure tongue 107 is not directly fixed to the arm 75a of the load beam and is constructed so as to conduct a pivoting motion. Four laser-irradiating positions, A, B, C, D, for correcting a static attitude of the HGA 100 are shown in FIGS.

3(A) and 3(B). Each irradiating position forms a region having a fixed area assigned to the metal layer of the flexure assembly in order to correct the static attitude of the HGA 100 by irradiating laser light and applying a bending deformation to the flexure assembly.

One or more of the four laser-irradiating positions, A, B, C, D, can be assigned to locations selected from the group consisting of main arms 104a, 104b, sub-arms 106a, 106b, or support arms 108a, 108b. In the present embodiment, however, four locations are assigned as laser-irradiating positions on the main arms 104a, 104b. The irradiating positions A and D are present on the surface of the metal layer of the flexure assembly 101 close to the load beam. The irradiating positions B and C are present on the surface of the metal layer of the flexure assembly 101 close to the head/slider 151. The number of irradiating positions and the positions on the flexure assembly are not limited to/by the present embodiment, and appropriate positions can be set according to a particular structure of the HGA.

Figure 4:
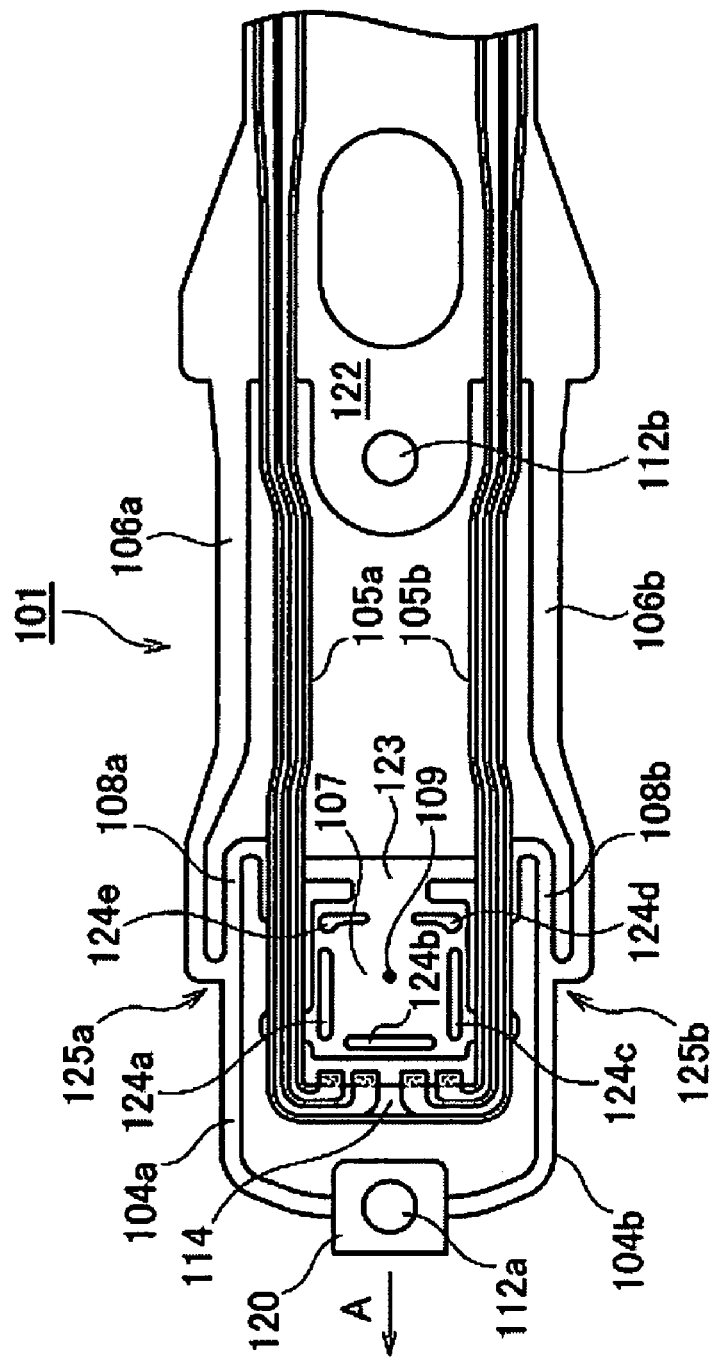
FIG. 4 is an enlarged view of the front-end side of a flexure assembly when it is seen from a head/slider installation direction.
Figure 5:
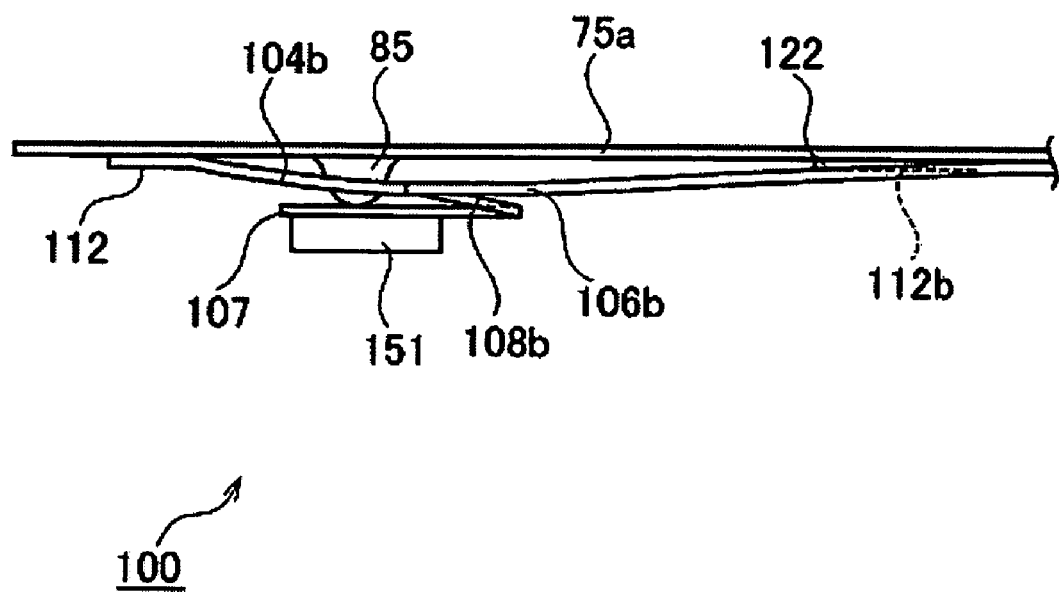
FIG. 5 is a side view of the front-end side of the head gimbal assembly 100.

FIG. 4 is an enlarged view of a front-end side of the flexure assembly 101 when seen from an installation direction of the head/slider 151. FIG. 5 is a side view of a front-end side of the HGA 100. In the remainder of this specification, the side of the HGA 100 that has the merge lip 33 is referred to as the front-end side, and the side having the actuator arm 27 is referred to as the support-end side. The flexure tongue 107 that forms part of the metal layer is formed between the welding spot 112a at the front-end side of the flexure assembly 101 and the welding spot 112b at the support-end side. The flexure tongue 107 has a dimple contact point (DCP) 109 defined almost at the center thereof, on the centerline of the flexure assembly 101 that connects the welding spots 112a and 112b.

The DCP 109 provides a supporting point for the flexure tongue 107 to conduct a pivoting motion by coming into contact with a dimple 85 (see FIG. 5) formed in the arm 75a of the load beam, at the load beam side (equivalent to a reverse side of the paper of FIG. 4). Although, in FIG. 4, a position of the DCP 109 is referred to from the installation side of the head/slider, the actual DCP is located at the reverse side of the paper.

A support region 120 at the front-end side is part of the metal layer constituting the flexure assembly, and is connected to the arm 75a of the load beam by being spot-welded at the welding spot 112a. One band-like pair of main arms 104a, 104b extend from neighboring edges of the welding spot 112a to the support-end side symmetrically with respect to the centerline that connects the welding spots 112a and 112b. The main arms 104a and 104b extend to the support-end side so as to surround the flexure tongue 107 and are integrated with the sub-arms 106a and 106b, respectively, at one pair of positions 125a, 125b, thus forming one pair of support arms (108a, 108b) to support a leading edge 123 of the flexure tongue 107. The main arms 104a, 104b, the sub-arms 106a, 106b, and the support arms 108a, 108b are parts of the metal layer which constitutes the flexure assembly.

The leading edge 123 here refers to the end of the flexure tongue that is located at a side opposite to that at which the head is positioned when the head/slider 151 is installed at the bottom of the flexure tongue 107. The opposite end of the flexure tongue 107 that faces the leading edge thereof is referred to as a trailing edge. In the remainder of this specification, the terms "leading edge" and "trailing edge" are also used for the head/slider 151 installed at the bottom of the flexure tongue 107.

The flexure assembly 101 according to the present embodiment is adapted to the magnetic disk device which rotates forward, and in FIG. 1, the magnetic disk 15 rotates in the direction of the arrow 16 extending from the support-end side, toward the front-end side, with respect to the flexure tongue 107. A viscous air stream that has occurred on the magnetic disk surface flows from the leading edge of the head/slider 151 into a clearance between the ABS thereof and the disk surface and flows out from the trailing edge. Levitation force is thus applied to the head/slider 151.

A support region 122 that forms part of the metal layer of the flexure assembly 101 is connected to the arm 75a of the load beam by being spot-welded at the welding spot 112b. One pair of sub-arms 106a, 106b symmetrically extend from neighboring edges of the welding spot 112b, toward the front-end side. The flexure tongue 107 has a plurality of polyimide island-like regions 124a, 124b, 124c, 124d, 124e sticking thereto as parts of the insulating layer constituting the flexure assembly 101. The island-like regions are intended to control an attitude of the head/slider 151 when it is attached to the surface of the flexure tongue 107 by use of an adhesive. Furthermore, one pair of wiring patterns 105a, 105b extend from the support region 122 at the support-end side to the trailing edge of the flexure tongue 107 in parallel with respect to a longitudinal centerline of the flexure assembly 101. In the support region 122, the wiring patterns 105a, 105b have the insulating layer sticking to the metal layer. After being separated from the support region 122, however, the wiring patterns extend to the support arms 108a, 108b in the vicinity of the flexure tongue 107 without sticking to other regions of the metal layer.

The paired wiring patterns 105a, 105b have respective conductor layers split into two pieces, thus including four lead wires entirely. The number of lead wires is selected as appropriate according to a particular head configuration. At the trailing edge of the flexure tongue 107 is formed a platform 114 for position-matching an end of each lead wire when the lead wire is connected to the slider pad provided on a lateral face of a trailing edge of the head/slider 151.

The irradiating positions C and B shown in FIG. 3(B) are located near the positions 125a and 125b, respectively. Also, the irradiating positions A and D shown in FIG. 3(A) are present on the reverse side of the irradiating positions C and B, respectively, on the metal layer. A line vertical to a longitudinal centerline of the head/slider 151 passes through the region of a fixed area, defined as the irradiating positions, across the DCP. The passage here also means that even if the vertical line is not present on the surfaces of the irradiating positions, a vertical projection of the vertical line with respect to each irradiating position passes therethrough.

When these positions are set as irradiating positions, the head/slider 151 conducts a pivoting motion about the DCP 109. When the static attitude of the HGA is corrected by laser light irradiation, therefore, high correction efficiency can be obtained since the static attitude deforms in directions of pitching and rolling about the DCP 109. The above position settings also minimize the residual distortion or stresses that change a contact pressure between the DCP 109 and the dimple 85 or adversely affect the pivoting motion as a result of the static attitude correction.

Next, the static attitude of the HGA 100 is described below referring to FIGS. 6(A) to 6(D). FIGS. 6(A) to 6(D) are diagrams depicting a lateral face of the HGA 100 schematically. FIG. 6(A) shows the attitude that the HGA 100 takes when it is assumed that the magnetic disk 15 is not present. The fixed portion 75b of the load beam is installed at a jig equivalent to the actuator arm 27 (see FIG. 1) of the carriage 23. The arm 75a of the load beam is coupled to the fixed portion 75b thereof via the hinge 77.

A distance between the face of the actuator arm that has the mount plate 79 fixed thereto by swage machining, and the surface of the magnetic disk 15, is referred to as the Z-Height. In FIG. 6(A), since the HGA 100 is installed at a jig and the magnetic disk 15 is not present, elasticity of the hinge 77 is completely released and the head/slider 151 stabilizes at a position below a virtual existence position of the magnetic disk 15. The hinge 77 is bias-loaded beforehand so that the head/slider 151 takes up such a position as shown in FIG. 6(A).

In FIG. 6(A), only the HGA associated with one face of the magnetic disk 15 is shown for the convenience of explanation. If an HGA associated with the other face of the magnetic disk 15 is depicted, however, a head/slider 151 of that HGA stabilizes at a position above a virtual existence position of the magnetic disk 15. FIG. 6(B) shows an attitude of the HGA 100 existing when rotation of the magnetic disk 15 is in a stopped state with the disk 15 and the HSA 13 installed on the base 11. When the rotation of the magnetic disk 15 is in a stopped state, since an air stream does not occur on the surface of the disk, the head/slider 151 is in contact with the surface thereof.

At this time, as will be made apparent by comparison with FIG. 6(A), the position of the head/slider 151 shifts upward and the elasticity of the hinge 77 pushes the head/slider 151 downward onto the surface of the magnetic disk 15 in a direction of an arrow 76. The force thus pushing the head/slider 151 onto the surface of the magnetic disk whose rotation is in a stopped state is referred to as a pressing load.

FIG. 6(C) is a diagram explaining a PSA that defines the static attitude of the HGA 100 in a pitching direction thereof. FIG. 6(D) is a diagram explaining an RSA that defines the static attitude of the HGA 100 in a rolling direction thereof. The static attitude is defined by the PSA and RSA measured when the head/slider 151 is free from any effects of an air stream. FIG. 6(C) schematically shows the attitude angle that the head/slider 151 is to form when force is applied to the merge lip 33 or the arm 75a of the load beam so that a spacing between the fixed portion 75b thereof and the on-ABS position of the head/slider 151 that is associated with the DCP 109 becomes equal to Z-Height. FIG. 6(C) is a side view taken from the same direction as that of FIG. 6(A). Although the PSA and the RSA are measured with the HGA 100 not being installed on the base 11 of the magnetic disk device, the magnetic disk 15 is shown for reference only, in FIGS. 6(C) and 6(D). The head/slider 151 fixed to the flexure tongue 107 (FIG. 4) is inclined in a direction of pitching about the dimple 85 formed in the arm 75a of the load beam, and has a required pitch static angle (PSA in degrees). The flexure tongue 107 and the arm 75a of the load beam are omitted from FIG. 6(C).

The PSA, before measured, is set so that as shown in FIG. 6(C), the position on the ABS that is associated with the DCP 109 is spaced with Z-Height under no force applied to the head/slider 151. During the setting operation, the angle that the ABS of the head/slider 151 which rotates about an axis passing through the DCP 109 and vertical to a longitudinal axis of the head/slider 151 is to form with respect to the surface of the magnetic disk 15, constitutes the PSA. The PSA is assigned a plus sign when, as in FIG. 6(C), the leading edge of the head/slider 151 maintains an attitude existing in the direction where the leading edge is to move away from the surface of the magnetic disk 15, with respect to the trailing edge of the head/slider 151. Conversely, when the leading edge maintains an attitude existing in the direction where the leading edge is to approach, a minus sign is assigned to the PSA.

FIG. 6(D) is a view of the head/slider 151 in FIG. 6(C) when the head/slider is seen from the trailing edge (front-end side) thereof at a PSA value of ±0 degree. The RSA, before measured, is set to the same position as that of measuring the position of the head/slider 151. During the setting operation, the angle that the ABS of the head/slider 151 which rotates about the longitudinal axis thereof with the DCP 109 as a center, is to form with respect to the surface of the magnetic disk 15, constitutes the RSA. The RSA is assigned a plus sign when the head/slider 151 rotates in the direction shown in FIG. 6(D). Conversely, when the head/slider 151 rotates in a reverse direction, a minus sign is assigned to the RSA. Both the PSA and the RSA are ±0 degree when the ABS is parallel to the surface of the magnetic disk 15.

The PSA existing when both the PSA and the RSA simultaneously have a certain angle becomes equal to the angle that a straight line on the ABS and the surface of the magnetic disk 15 are to form when a plane inclusive of the DCP 109, parallel to the longitudinal axis of the head/slider, and vertical to the surface of the magnetic disk 15 intersects with the ABS. At the same time, the RSA becomes equal to the angle that a straight line on the ABS and the surface of the magnetic disk 15 are to form when a plane inclusive of the DCP 109, vertical to the longitudinal axis of the head/slider, and vertical to the surface of the magnetic disk 15 intersects with the ABS. A target attitude of the HGA 100 in the present embodiment is ±1 degree in the PSA and ±0 degree in the RSA.

The attitude that the head/slider 151 takes to fly when the ABS thereof undergoes lifting force from the viscous air stream occurring on the surface of the magnetic disk 15 which rotates is referred to as a dynamic attitude. A target angle value in a pitching direction typically differs from the PSA. When the head/slider 151 flies maintaining a slight spacing with respect to the surface of the magnetic disk 15, the head/slider 151 maintains height of the head with respect to a magnetic layer, in a required range, by following an undulation of the surface of the magnetic disk 15 while conducting a pivoting motion about the DCP 109. To maintain the dynamic attitude in a required range and realize appropriate pivoting, the PSA and RSA determining a static attitude of the HGA 100 need to be as close as possible to respective target values. In an as-assembled state of the HGA 100, since its static attitude is typically distant from an ideal target value, the PSA and the RSA or either one thereof needs to be corrected toward the target value.

Figure 7:
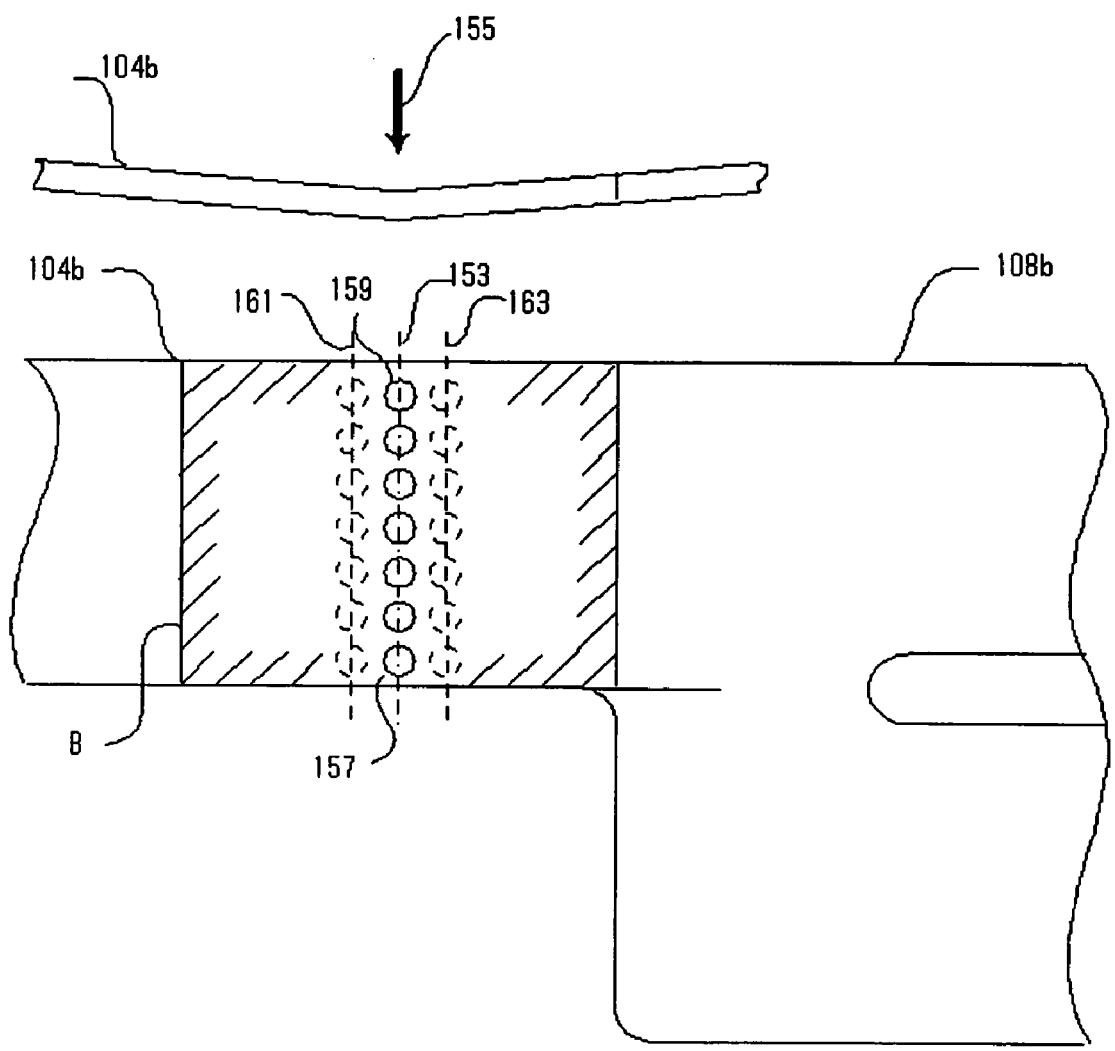
FIG. 7 is a diagram explaining a method of irradiating laser light at irradiating positions.

FIG. 7 is a diagram explaining a method of irradiating a laser beam to the irradiating positions A, B, C, D, with the irradiating position B taken as an example. A centerline 153 indicative of the center of the irradiating position B is a vertical projection of a line which passes through the DCP 109 and is vertical to a longitudinal centerline of the head/slider 151 with respect to a face of the irradiating position B. The irradiating position B has a region of a fixed area, and centerline 153 passes through the region of the irradiating position B. Similarly, the centerline 153 also passes other regions of the irradiating positions A, C, D.

The main arm 104b has the property that as laser light beams 155 are irradiated along the center line 153 from a direction almost vertical to the surface of the main arm 104b, this arm receives thermal energy and bends in a direction of an irradiation source of the laser light, as shown in FIG. 7. The laser beams are generated by a pulse laser, thus forming beam spots of a small aperture on the face of the irradiating position through an optical lens mechanism. As the region from a starting spot 157 to an ending spot 159 is scanned with the beams of the pulse laser along the centerline 153 at a fixed rate, laser energy is discontinuously irradiated onto the surface of the irradiating position at fixed spot intervals. Irradiation of the single string of laser light beams constituted by the plural spots from the starting spot 157 to the ending spot 159 is referred to as a unit shot or one shot.

The unit shot is not limited to a method of irradiating laser beams discontinuously onto the surface of a irradiating position, and may be applied when laser pulse beam spots are to be continuously irradiated or, in lieu of the pulse laser, laser light of a fixed output level is to be continuously irradiated. When the unit shot is repeated a plurality of times for each irradiating position, the static attitude of the HGA 100 changes with a magnitude proportional to the number of unit shots. To obtain a greater displacement in static attitude by increasing the number of unit shots, unit shots are to be added similarly along a parallel line 161 or 163 present at a position parallel to, and proximately to, the centerline 153. An even greater displacement can be obtained by adding horizontal strings of unit shots around the centerline 153 similarly. A spot diameter of 16 to 20 µm, a spot interval of 28 µm, and a beam interstring spacing of 28 µm can be selected for the laser beam by way of example.

The laser energy supplied with a laser pulse output level kept constant and an irradiation time set equal to each spot is equalized while the static attitude is being corrected. The amount of displacement in static attitude due to a unit shot can be adjusted by regulating the output of the laser pulse or regulating the spot interval. Use of the correction method according to the present invention makes it possible to realize highly accurate attitude correction by reducing the amount of displacement in static attitude per unit shot, although this increases the number of unit shots required. Unit shots are conducted in an irradiation region selected for linear amounts of displacement.

Figure 8:
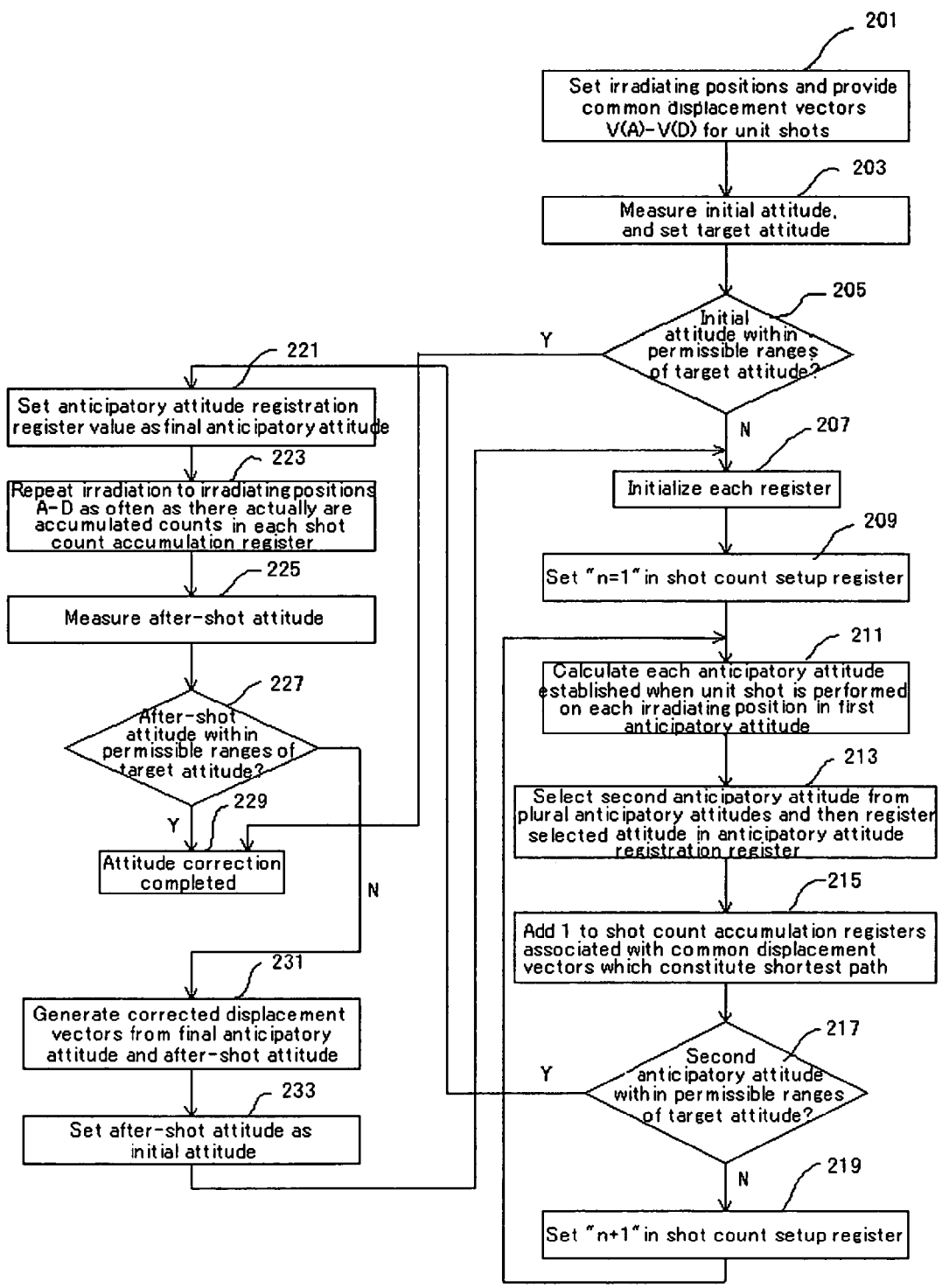
FIG. 8 is a flowchart showing a method of correcting the static attitude of the head gimbal assembly by determining laser light irradiating positions and doses.
Figure 10:
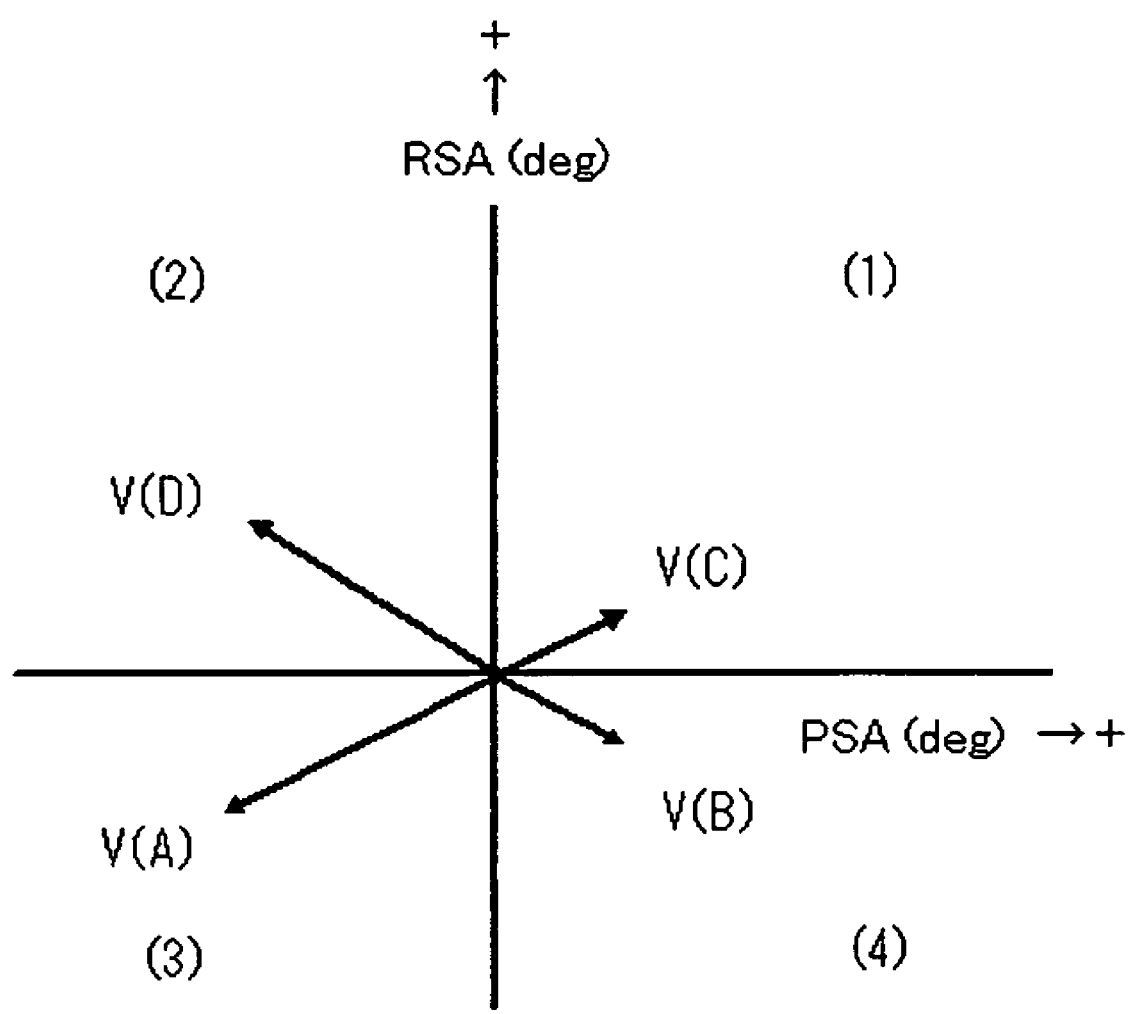
FIG. 10 is a diagram explaining the common displacement vectors generated when unit shots of laser light are performed on each irradiating position.
Figure 1:
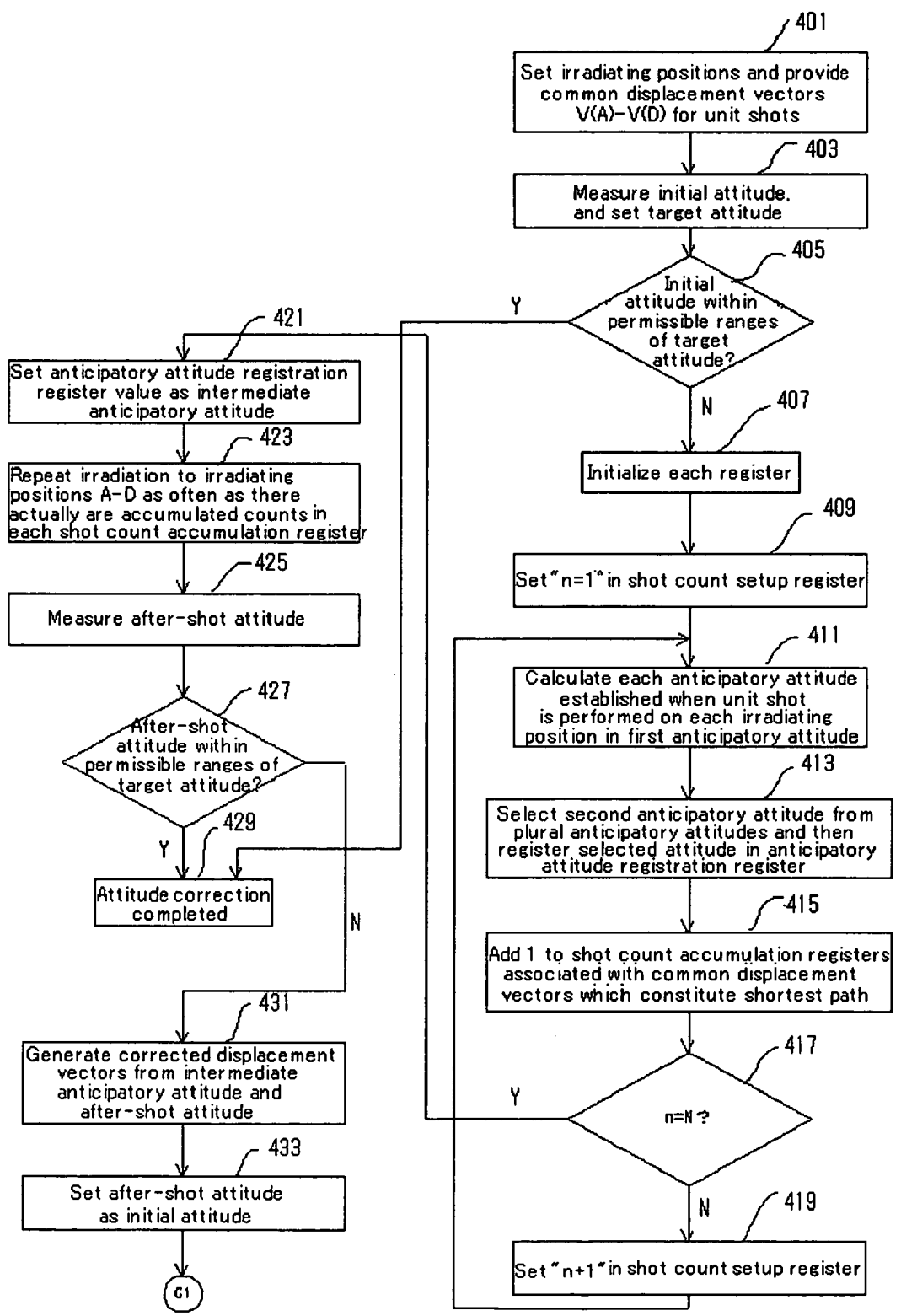

Next, a method of correcting the static attitude of the HGA by irradiating laser light is described below referring to FIGS. 8 through 11(A) and 11(B). FIG. 8 is a flowchart showing a method of correcting the static attitude of the HGA by determining laser light irradiating positions and doses. FIGS. 9(A) to 9(D) show measured data on changes in the static attitude of the HGA and on the number of unit shots of laser light for each irradiating position. FIG. 10 is a diagram explaining common displacement vectors equivalent to the amounts of displacement in the static attitude of the HGA due to unit shots of laser light for each irradiating position. FIGS. 11(A) and 11(B) are diagrams each explaining the vector group formed to construct the shortest path. In the present embodiment, the number of unit shots of laser light for each irradiating position is computer-calculated beforehand to construct the shortest path and thus to realize efficient, highly accurate attitude correction.

In block 201, four laser light irradiating positions, A, B, C, D, are set for the HGA 100, as shown in FIGS. 3(A) and 3(B). Furthermore, common displacement vectors V(A), V(B), V(C), and V(D) are provided for each irradiating position. Actual unit shots under the same irradiating conditions such as irradiating positions and irradiating method are conducted for a plurality of HGAs of the same structure as that of the HGA 100 to be corrected in terms of static attitude. Next, displacement vectors equivalent to the amounts of displacement in static attitude at each such irradiation position are calculated for each HGA. The common displacement vectors are the typical average values or median values derived from the above plural displacement vectors. The displacement vectors relating to each HGA are those PSA and RSA variations due to a unit shot with respect to either irradiating position that are obtained by measuring a change in the static attitude of the jig-fixed HGA due to a unit shot of laser light to that irradiating position, with respect to the static attitude that the HGA takes before it undergoes a unit shot of laser light. The displacement vectors become characteristic values thereof for each irradiating position.

FIGS. 9(A) to 9(D) are graphs showing measurement results on the variations ($\Delta$PSA) in PSA angle (degrees) and variations ($\Delta$RSA) in RSA angle (degrees) that were observed when a unit shot of laser light was repeated a plurality of times with respect to each of the irradiating positions A, B, C, D set for the HGA. In these graphs, the number of unit shots is shown on a horizontal axis, and the changes in the PSA and RSA angles before and after the irradiation are shown on a vertical axis. Also, lines "a" and "b" in each graph denote $\Delta$PSA and $\Delta$RSA, respectively.

FIGS. 9(A) to 9(D) are associated with the variations in PSA and RSA that were observed when a unit shot of laser light was repeated the plurality of times with respect to each of the irradiating positions A, B, C, D, respectively. These graphs show the linear changes in PSA and RSA, observed when the number of unit shots with respect to each irradiating position was increased. Therefore, since the variations in PSA and RSA per unit shot are not affected by increasing the number of unit shots, the anticipatory static attitude values changing according to the number of unit shots that was set for each irradiating position can be calculated. However, since PSA and RSA simultaneously suffer a change due to the unit shot with respect to whatever irradiating position, the algorithm described below is used such that attitude corrections can be conducted with the smallest possible number of unit shots with respect to each irradiating position.

Displacement vectors can be defined as the vectors on orthogonal coordinates that take, as their components, gradients of the PSA and RSA linearly changing according to the particular number of unit shots with respect to each irradiating position. FIG. 10 represents on orthogonal coordinates the common displacement vectors V(A), V(B), V(C), and V(D) that were obtained by calculating displacement vectors from the data measurements shown in FIGS. 9(A) to 9(D) for the plural HGAs, and then calculating average values of each displacement vector. The common displacement vector V(C) is present in a first quadrant (1), and takes, as components, the variations in the PSA and RSA both of which change in the plus direction when a unit shot of laser light to the irradiating position C is conducted. The common displacement vector V(D) is present in a second quadrant (2), and takes, as components, the variations in the PSA and RSA which change in the minus and plus directions, respectively, when a unit shot of laser light to the irradiating position D is conducted. The common displacement vector V(A) is present in a third quadrant (3), and takes, as components, the variations in the PSA and RSA both of which change in the minus direction when a unit shot of laser light to the irradiating position A is conducted. The common displacement vector V(B) is present in a fourth quadrant (4), and takes, as components, the variations in the PSA and RSA which change in the plus and minus directions, respectively, when a unit shot of laser light to the irradiating position B is conducted.

Combinations of the plus and minus PSA and RSA values that are the components of the common displacement vectors V(A), V(B), V(C), and V(D) with respect to the irradiating positions, A, B, C, D, are all different from one another. Therefore, irrespective of a relative position of the quadrant, with respect to a target value, of the static attitude of the HGA 100 to be corrected, PSA and RSA can be simultaneously brought close to a target attitude by combining the number of unit shots with respect to each irradiating position appropriately. The total number of unit shots, however, is preferably minimized. This correspondingly saves the time spent in correcting the attitude, and thus increases production volumes. It also allows prevention of thermal HGA stressing greater than necessary. The common displacement vectors can be used in common for attitude correction of HGAs of the same structure, and are therefore convenient for increasing production volumes. When highly accurate attitude correction is required, however, these displacement vectors may not function sufficiently.

Figures 15, 16:
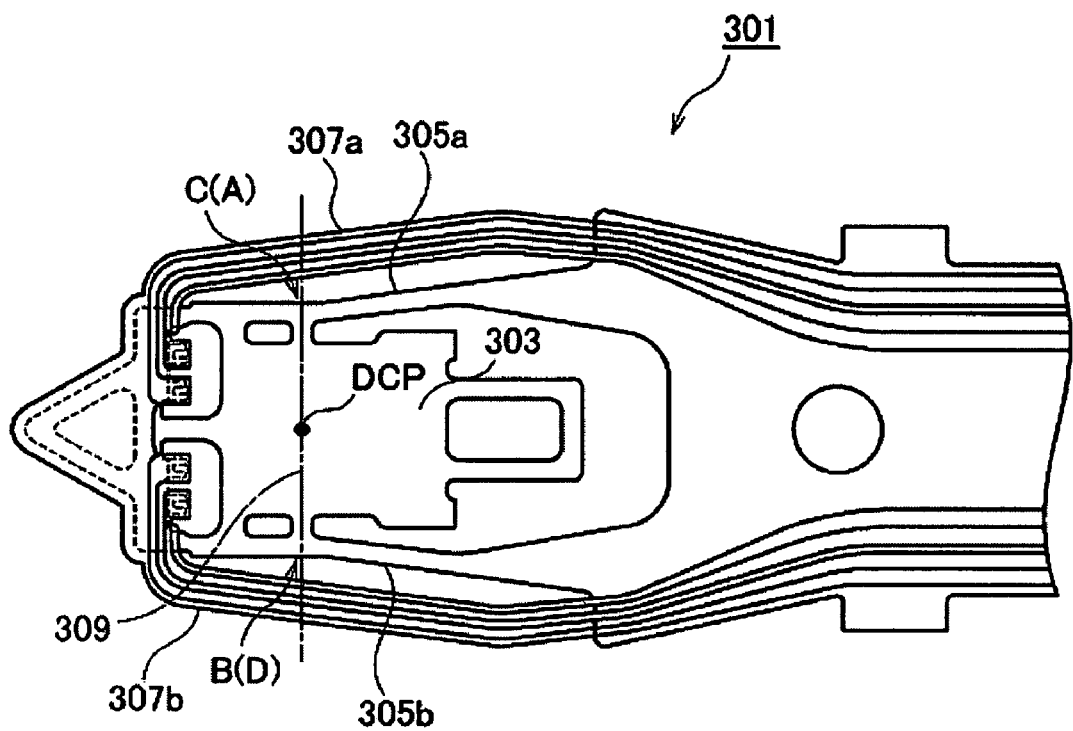
FIG. 15 is a diagram that explains irradiating positions with respect to a flexure assembly of another structure.
FIG. 16 is a diagram showing an example of a vector table.

Although the common displacement vectors are to be stored into a vector table provided in a storage device of a computer, these displacement vectors are constructed so that as will be later described, they can be updated using measured HGA data concerned with attitude correction. An example of a vector table in which the common displacement vectors of FIG. 10 were stored is shown in FIG. 16. Variations in PSA and RSA angles (degrees) due to unit shots with respect to each irradiating position are stored together with signs into the vector table. Although the common displacement vectors are represented in an orthogonal coordinate system in FIG. 10, these vectors can likewise be represented in other coordinate systems such as a polar coordinate system.

In block 203, a static attitude of the HGA 100 whose assembly has been completed is measured (hereinafter, this attitude is referred to as initial attitude) and then an ideal static attitude target value is set (hereinafter, this attitude is referred to as the target attitude). If the initial attitude of the HGA 100 departs from as-assembled tolerances thereof, since attitude correction by laser light irradiation is likely to change the flexure assembly in motion characteristics, the correction is stopped upon detection of the departure. For the target attitude, a fixed independent permissible range with respect to PSA and RSA each is set in both plus and minus directions, and during attitude correction of the HGA, the static attitude that was corrected by actually irradiating laser light needs to be adjusted to stay within the permissible ranges of the target attitude.

In block 205, permissible ranges of an initial attitude 181 and those of a target attitude O are compared. In the present embodiment, a target attitude value of +1 degree in PSA and ±0 degree in RSA is set as an origin O of FIG. 11(A). In the example of FIGS. 11(A) and 11(B), the PSA and RSA of the initial attitude 181 both exist in the first quadrant (1) of the plus direction and are given as values outside the permissible ranges of the target attitude. If the initial attitude 181 is within the permissible ranges of the target attitude, control is transferred to block 229 to finish the attitude-correcting operations. If the initial attitude 181 is outside the permissible ranges of the target attitude O, control is transferred to block 207 to initiate a calculation process for the number of unit shots with respect to each irradiating position, required for attitude correction.

A computer for calculating the number of unit shots includes a shot count setup register, shot count accumulation registers A, B, C, and D, and an anticipatory attitude registration register. The shot count setup register is used as a counter for calculating the total number of unit shots, "n", to each irradiating position. The shot count accumulation registers A, B, C, D are associated with the irradiating positions, A, B, C, D, respectively, and these registers each store the number of common displacement vectors included in a vector group which constitutes the shortest path 185 (see FIG. 11(A)) extending from an initial attitude to a final anticipatory attitude. The anticipatory attitude registration register stores an anticipatory attitude that is an anticipatory value of the static attitude changing with the unit shots with respect to each irradiating position of the HGA 100. The anticipatory attitude registration register also stores a final anticipatory attitude 184 that is the value obtained when the above anticipatory attitude falls within the permissible ranges of the target attitude.

In block 207, the shot count setup register, the shot count accumulation registers, and the anticipatory attitude registration register are reset, and then control is transferred to block 209. In block 209, 1 is set in the shot count setup register as the total number of unit shots, "n", with respect to the four irradiating positions.

In block 211, the four anticipatory attitudes that have been generated by synthesizing the four displacement vectors with respect to the initial attitude 181 are calculated using the vector table. Since, as described above, both the PSA and RSA of each displacement vector with respect to a unit shot simultaneously change, selection only of a single common displacement vector typically does not make it possible for the PSA and RSA to range from the initial attitude 181 to the permissible ranges of the target attitude. In the present invention, as described below, the vector group of the shortest path 185 from the initial attitude 181 to the final anticipatory attitude 184 is formed so that both the PSA and RSA fall within the permissible ranges of the target attitude. The shortest path 185 here is a path formed to minimize the total number of common displacement vectors included in the vector group of the plural common displacement vectors which were synthesized so as to connect the initial attitude 181 and the final anticipatory attitude 184.

In FIG. 11(B), when the common displacement vectors V(A), V(B), V(C), and V(D) are synthesized with respect to the initial attitude 181, four anticipatory attitudes, 188, 189, 190, 191, are obtained. When a path of a reverse procedure from block 219 to block 207 is formed, the initial path 181 in FIG. 11(B) can be considered as a first anticipatory attitude that serves as an ending point of an arbitrary vector within the vector group constituting the shortest path 185.

In block 213, either common displacement vector that gives the static attitude closest to the target attitude O is selected from the group consisting of the four anticipatory attitudes, 188, 189, 190, 191. In FIG. 11(B), among the four anticipatory attitudes, the anticipatory attitude 188 is the closest to the target attitude O, for which reason, an ending point of the common displacement vector V(A) is selected as a second anticipatory attitude, and consequently, its PSA and RSA are registered in the anticipatory attitude registration register. The common displacement vector V(A) giving the second anticipatory attitude with respect to the initial attitude 181 forms part of the vector group constituting the shortest path 185.

In block 215, 1 is added to the shot count accumulation register A associated with the common displacement vector V(A) that has constituted the vector group of the shortest path 185. After this, whether the second anticipatory attitude falls within the permissible ranges of the target attitude is judged in block 217. If the second anticipatory attitude falls within the permissible ranges of the target attitude, control is transferred to block 221. If the second anticipatory attitude does not fall within the permissible ranges of the target attitude, control is transferred to block 219, in which 1 is then added to the shot count setup register. Thus, "n=2" is set and then control is returned to block 211. After this, the procedure from block 211 to block 219 is repeated until the second anticipatory attitude has fallen within the permissible ranges of the target attitude. The anticipatory attitude that was stored into the anticipatory attitude registration register at this time serves as the first anticipatory attitude in block 211. In block 213, contents of the anticipatory attitude registration register are updated to the second anticipatory attitude calculated by synthesizing the first anticipatory attitude and the displacement vectors constituting the shortest path.

Calculation of the vector group of the shortest path 185 which was formed using this procedure, and calculation of the number of shots with respect to each irradiating position are described below referring to FIG. 11(A). In a region from the initial attitude 181 to the static attitude 182 existing on the shortest path 185, the common displacement vector V(A) forms the shortest path 185 by being generated 10 times. A shot count of 10 is therefore added to the shot count accumulation register A. In a region from the static attitude 182 to a static attitude 183, the common displacement vector V(B) forms the shortest path 185. A shot count of 1 is therefore added to the shot count accumulation register B. In the present embodiment, over the entire region from the initial attitude 181 to the final anticipatory attitude 184, the vector group of the shortest path 185 is constituted only by the common displacement vectors V(A) and V(B). In general, however, the common displacement vectors constituting a vector group are determined by a position at which the initial attitude 181 exists from the first quadrant (1) to fourth quadrant (4) on the orthogonal coordinates with the target attitude O as the origin, or by a magnitude of each such common displacement vector.

In block 221, the second anticipatory attitude stored within the anticipatory attitude registration register is set up as the final anticipatory attitude 184. By use of the procedure up to block 221, the number of unit shots of laser light with respect to each irradiating position is calculated from the vector group constituting the shortest path 185, and then control is transferred to block 223. In block 223, actual irradiation of laser light to the irradiating positions A, B, C, D is repeated in the manner described with reference to FIG. 7, as often as there actually are unit shot counts stored in the associated shot count accumulation registers A, B, C, D.

Variations in PSA and RSA according to the particular number of unit shots depend only on the number of shots with respect to each irradiating position. There is no need, therefore, to conduct unit shots in order of the common displacement vectors included in the vector group that formed the shortest path 185. In other words, attitude corrections toward the target attitude can be conducted just by repeating unit shot with respect to associated irradiating positions as often as there actually are common displacement vectors included in the vector group.

In block 225, an after-shot attitude that is the static attitude of the HGA 100 existing after laser light has been actually irradiated is measured and then the after-shot attitude is judged as to whether it falls within the permissible ranges of the target attitude O. If the after-shot attitude falls within the permissible ranges of the target attitude, control is transferred to block 229 to finish the correcting operations. In the present embodiment, FIG. 11(A) indicates that an after-shot attitude 186 falls outside the permissible ranges of the target attitude O.

If the common displacement vectors that were provided in block 201 beforehand are accurately representative of any variations in PSA and RSA per unit shot with respect to the HGA to be corrected in attitude, the after-shot attitude 186 that was measured in block 225 will almost equal the final anticipatory attitude 184, thus falling within the permissible ranges of the target attitude O. In actual operation, however, the after-shot attitude 186 may not fall within the permissible ranges of the target attitude O because of the possible non-uniformity of the conditions affecting the attitude correction, such as a composition and thickness of the constituting material of the HGA 100, irradiating positions, and laser light output levels. This tendency grows as the permissible ranges of the target attitude O are narrowed by further decreases in flying height of the head/slider above the magnetic disk surface.

If, in block 227, the after-shot attitude 186 does not fall within the permissible ranges of the target attitude O, control is transferred to block 231, displacement vectors based on the correction of the common displacement vectors that uses data on the HGA are generated to update the vector table. The corrected displacement vectors are values that incorporate the variations in PSA and RSA that were measured by actually performing unit shots on the HGA to be corrected in attitude. The vector group of the new shortest path from the after-shot attitude 186 to the target attitude O, therefore, is formed using the corrected displacement vectors or the corrected displacement vectors and the common displacement vectors. After this, actual irradiation of laser light to each irradiating position is repeatedly conducted according to the number of unit shots calculated from the vector group. Thus, attitude corrections can be conducted with high accuracy for the attitude to fall within the permissible ranges of the target attitude O.

In the embodiment of FIG. 11(A), the after-shot attitude 186 is present in the second quadrant (2) and does not fall within the permissible ranges of the target attitude. Corrected displacement vectors are therefore generated using the PSA and RSA values of the initial attitude 181, the final anticipatory attitude 184, and the after-shot attitude 186 each. As shown in FIG. 11(A), in block 221, the final anticipatory attitude 184 was calculated as the ending point of the vector group obtained by synthesizing 16 common displacement vectors V(A) and six common displacement vectors V(B) with respect to the initial attitude 181. Correction to the after-shot attitude 186, however, was achieved by actually repeating a unit shot 16 times with respect to the irradiating position A and six times with respect to the irradiating position B. The common displacement vectors are therefore corrected so that when a unit shot is repeated the same number of times with respect to both irradiating positions A and B, the final anticipatory attitude becomes the after-shot attitude 186. After the corrections, the corrected displacement vectors are calculated.

The corrected displacement vectors are calculated by correcting the PSA and RSA of each common displacement vector that are the components thereof. In order to correct the PSA component of the common displacement vector, the value of X=L1 (PSA)/L (PSA) that is a ratio of a difference L1 (PSA) in PSA between the initial attitude 181 and the after-shot attitude 186, and a difference L (PSA) in PSA between the initial attitude 181 and the final anticipatory attitude 184, is first calculated. Next, PSA components of corrected displacement vectors V(A) and V(B) are calculated by multiplying, by the value X of the ratio, the common displacement vectors V(A) and V(B) included in the vector group constituting the shortest path 185 extending from the initial attitude 181 to the final anticipatory attitude 184.

A correction on the RSA component of the common displacement vector is also conducted similarly to the above. That is, the value of Y=L1 (RSA)/L (RSA) that is a ratio of a difference L1 (RSA) in RSA between the initial attitude 181 and the after-shot attitude 186, and a difference L (RSA) in RSA between the initial attitude 181 and the final anticipatory attitude 184, is first calculated. Next, RSA components of the corrected displacement vectors V(A) and V(B) are calculated by multiplying, by the value Y of the ratio, the common displacement vectors V(A) and V(B) that were selected as elements of the vector group of the shortest path extending from the initial attitude 181 to the after-shot attitude 186.

Although it is possible to use a method of conducting a laser light output level change based on the difference between the final anticipatory attitude and the after-shot attitude, the change of the laser light output level correspondingly increases the time required for the output level to stabilize. Unlike this method, the method of forming a vector group of the new shortest path by using corrected displacement vectors according to the present invention neither requires such a laser light output level change, nor reduces productivity since the corrected displacement vectors can be calculated within a short time by use of a computer.

After the common displacement vectors V(A) and V(B) have been corrected to calculate corrected displacement vectors v(A) and v(B), the vector table is updated by replacing, with the corrected displacement vectors v(A) and v(B), the common displacement vectors V(A) and V(B) that were stored in the vector table. Contents of the updated vector table become the corrected displacement vectors v(A), v(B) and the common displacement vectors V(C), V(D). Since the corrected displacement vectors are generated by correcting the common displacement vectors included in the vector group of the shortest path 185 extending from the initial attitude 181 to the final anticipatory attitude 184, which of the common displacement vectors in the updated vector table is replaced with a corrected displacement vector depends on the common displacement vectors included in the vector group. In general, two or more common displacement vectors are corrected.

After this, in block 233, the after-shot attitude 186 that was measured in block 225 is set as an initial attitude. Next, control is returned to block 207, a new vector group is formed that extends to a new final anticipatory attitude, and the procedure is repeated until the after-shot attitude has been corrected in block 227 to fall within the target attitude ranges. During the correction process, at least two common displacement vectors stored within the vector table are replaced with corrected displacement vectors in block 231. Accordingly, the vector group of the new shortest path formed by repeating the procedure from block 207 to block 219 includes the corrected displacement vectors or the corrected displacement vectors and the common displacement vectors.

The corrected displacement vectors v(A), v(B) are vectors calculated from the actual variations in static attitude that occurred when unit shots of laser light were performed on the HGA to be corrected. For this reason, the actual variations in PSA and RSA with respect to the unit shots are high in measurement accuracy. Even if the updated vector table includes common displacement vectors and corrected displacement vectors in mixed form, when the corrected displacement vectors are used in formation of the new shortest path, a new after-shot attitude with respect to a new final anticipatory attitude correspondingly improves in accuracy. This means, therefore, that the static attitude can be corrected even to fall within stringent permissible ranges of the target attitude.

If the after-shot attitude that was measured in block 227 for the second time does not fall within the target attitude ranges, corrected displacement vectors are further generated. At this time, if a common displacement vector V(C) or V(D) is used in the shortest path leading to a second final anticipatory attitude, the vectors is also corrected to corrected displacement vectors v(C) or v(D), with which stored contents of the vector table are then replaced. At this time, if a corrected displacement vector v(A) or v(B) constitutes the shortest path leading to the second final anticipatory attitude, only the common displacement vector constituting the shortest path formed for the second time may be corrected without that corrected displacement vector being further corrected.

Next, another method of correcting the static attitude of the HGA 100 is described below referring to flowcharts of FIGS. 12 and 13. The correction method shown in the flowchart of FIG. 8 is by calculating the number of common displacement vectors included in the vector group constituting the shortest path from the initial attitude 181 to the final anticipatory attitude, repeating unit shots as often as there actually are common displacement vectors associated with each irradiating position, and generating corrected displacement vectors if the after-shot attitude 186 does not fall within the permissible ranges of the target attitude. In the method of FIG. 8, although the first after-shot attitude is likely to fall within the permissible ranges of the target attitude, the number of unit shots calculated using common displacement vectors will increase if the distance from the initial attitude to the target attitude is too long. As a result, the possible increase in departure between the first after-shot attitude and the final anticipatory attitude is likely to increase the total number of shots that also includes the number of unit shots calculated using corrected displacement vectors.

Figure 13:
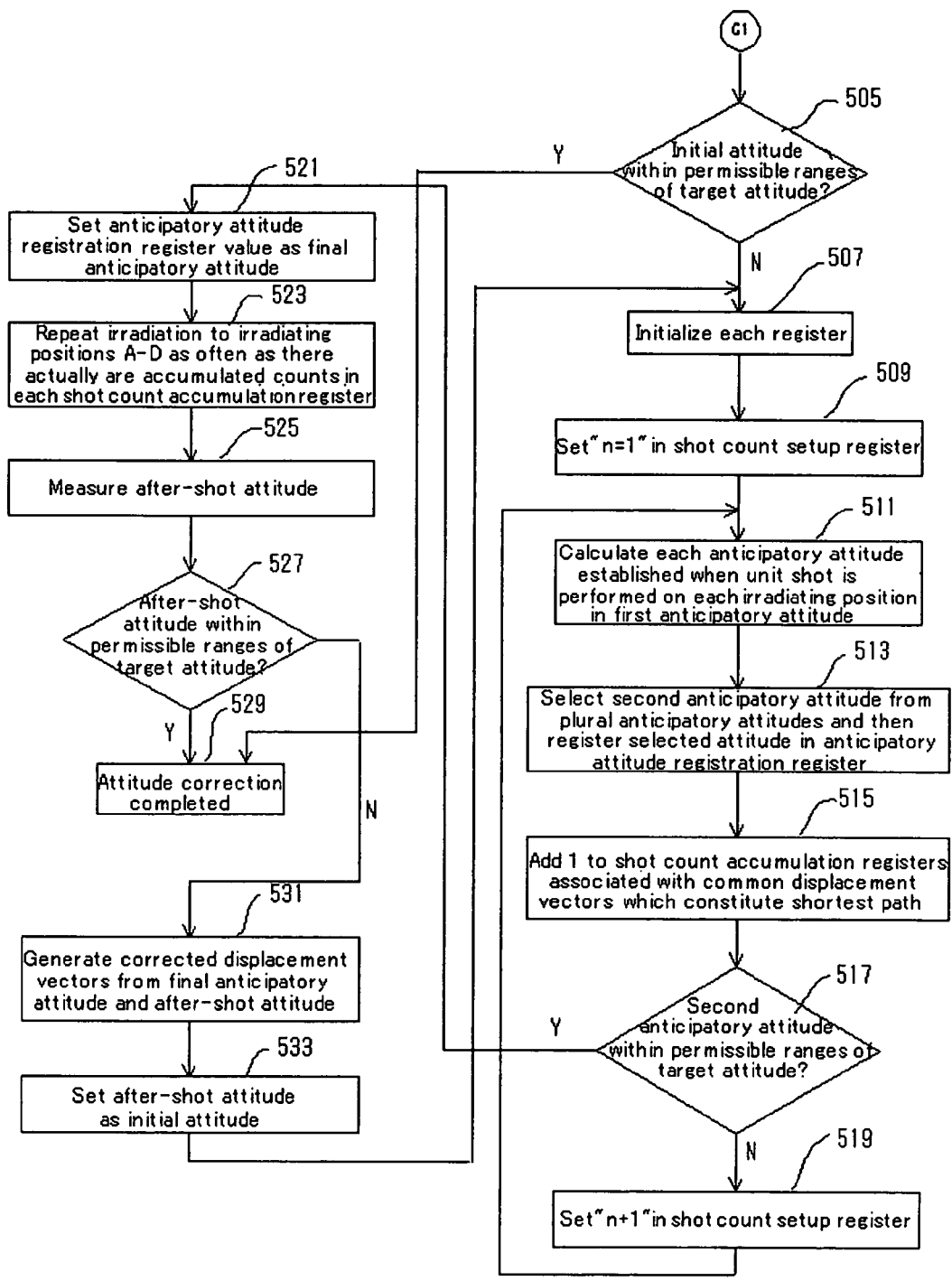
FIG. 13 is another part of a flowchart explaining the above method of correcting the static attitude of the head gimbal assembly.

Under the correction method shown in FIGS. 12 and 13, for the HGA 100 that is to be corrected, an intermediate anticipatory attitude 187 is set at, for example, an ending point of any vector of FIG. 11(A), halfway on the shortest path, and unit shots at each irradiating position are repeated according to the number of common displacement vectors included in the vector group constituting the shortest path up to the intermediate anticipatory attitude. After the unit shots, corrected displacement vectors are generated by measuring an after-shot attitude to update the vector table, and then a vector group of the new shortest path ranging from the intermediate anticipatory attitude 187 to the final anticipatory attitude is formed using the corrected displacement vectors (or corrected displacement vectors and common displacement vectors) that were stored into the updated vector table.

Blocks 401 to 415 in FIG. 12 are of the same procedure as that of blocks 201 to 215 of FIG. 8. In block 417, it is judged whether the value of "n" of the shot count setup register is equal to N, wherein N is an integer value previously set for the total number of unit shots at the four irradiating positions. N is also the total number of common displacement vectors constituting the shortest path from the initial attitude to the intermediate anticipatory attitude.

About ½ to ⅓ of the total number of common displacement vectors included in the vector group constituting the shortest path up to the permissible ranges of the target attitude is set as N to allow for a case in which, in block 413, the second anticipatory attitude or intermediate anticipatory attitude stored into the anticipatory attitude registration register may fall outside the permissible ranges of the target attitude at that point of time. When the total number of shots, "n", equals N in block 417, control is transferred to block 421 and the value of the second anticipatory attitude stored in the anticipatory attitude registration register is set as an intermediate anticipatory attitude. Blocks 423 to 429 are of the same procedure as that of blocks 223 to 229 of FIG. 8.

In block 431, the vector table is updated by calculating corrected displacement vectors on the basis of the intermediate anticipatory attitude and the after-shot attitude, similarly to the calculation process in block 231 of FIG. 8. A value of a ratio of a difference between the initial attitude and the after-shot attitude, and a difference between the initial attitude and the intermediate anticipatory attitude, is first calculated to derive the corrected displacement vectors. The value of the ratio is calculated for PSA and RSA each. Next, PSA and RSA components are calculated by multiplying, by respective ratios, the common displacement vectors included in the vector group of the shortest path extending from the initial attitude to the final anticipatory attitude.

Control is subsequently transferred to block 505 of FIG. 13. Although blocks 505 to 533 are of the same procedure as that of blocks 205 to 233 of FIG. 8, the vector table that was updated in block 431 is used to select a second anticipatory attitude in block 513. As a result, the vector group of the shortest path from the initial attitude to the intermediate anticipatory attitude is constituted by common displacement vectors. Likewise, a vector group of the new shortest path from the intermediate anticipatory attitude to the final anticipatory attitude is constituted by corrected displacement vectors or by corrected displacement vectors and common displacement vectors.

Use of the procedure shown in FIGS. 12 and 13 makes it possible to conduct attitude corrections by determining the number of shots at each irradiating position, based on the common displacement vectors included in the vector group of the shortest path to the intermediate anticipatory attitude, conducting actual laser light shots to update the vector table, and forming the highly accurate shortest path by use of the updated vector table. Therefore, if the permissible ranges of the target attitude are too narrow and the procedure shown in FIG. 8 does not allow the after-shot attitude to fall within the target attitude ranges after the first actual shot, the total number of shots can be reduced using the procedure of FIGS. 12 and 13. When the HSA is constructed with a plurality of HGAs included, attitude corrections on each of the HGAs are conducted using the procedure of FIGS. 12 and 13.

Figure 14:
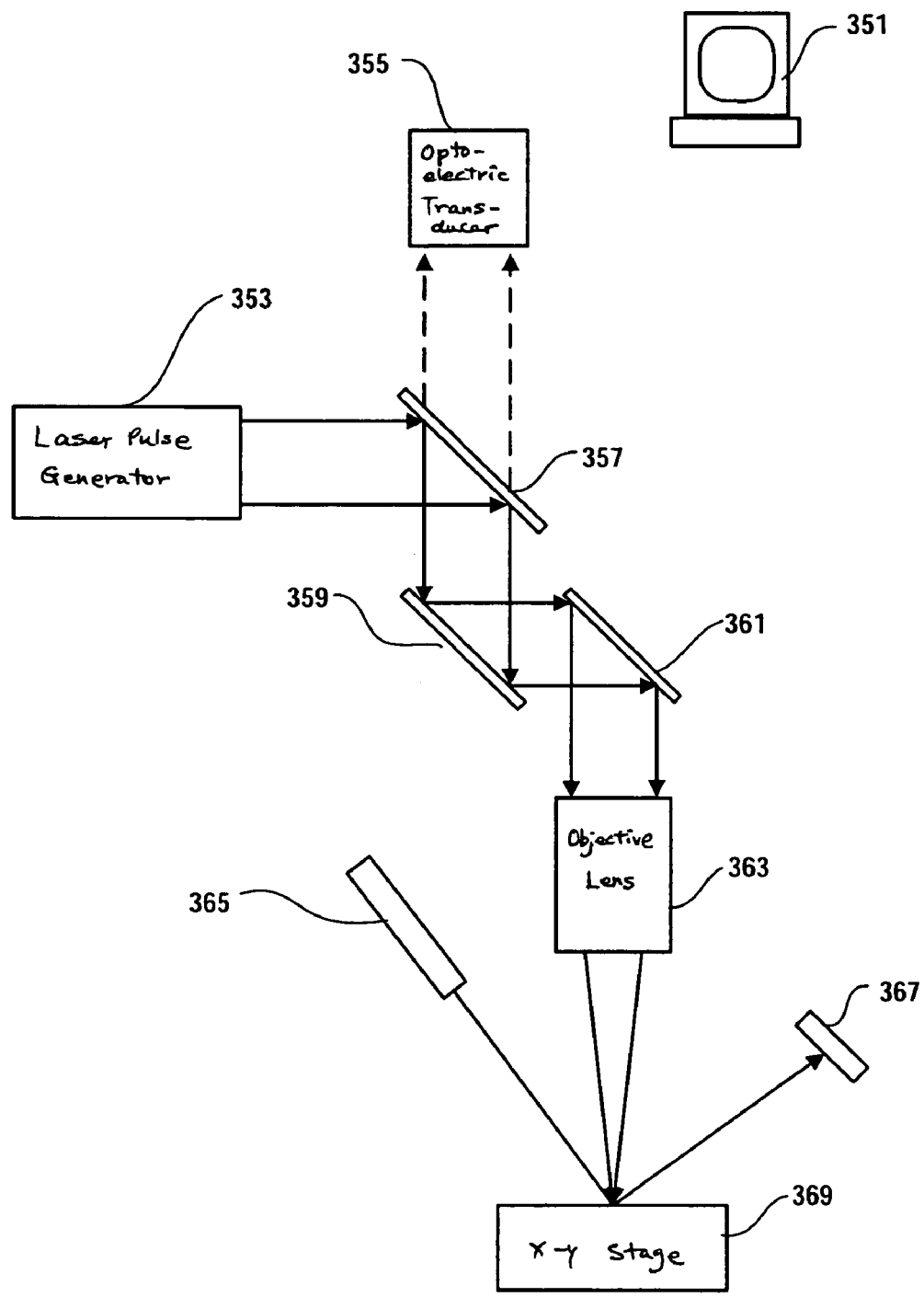
FIG. 14 is a schematic block diagram of an attitude correction system for correcting the static attitude of the head gimbal assembly.

FIG. 14 is a schematic block diagram of an attitude correction system for correcting the attitude of the HGA by laser light shots. A computer 351 is equipped with registers for setting up shot counts, for accumulating shot counts, and for registering anticipatory attitudes, or with storage regions in lieu of these registers. The computer 351 also stores a program for executing the procedure laid down in FIGS. 8, 12 and 13, and the vector table described using FIG. 16, and calculates the vector group constituting the shortest path from the initial attitude to the permissible ranges of the target attitude. Additionally, the computer 351 controls the entire system by, for example, storing measured static attitude data on the HGA to be corrected in attitude, and monitoring a state of the HGA.

A laser pulse generator 353 has an optical lens mechanism inside, and emits paralleled pencils of laser pulsed light from a semiconductor laser such as a YAG laser, toward a half mirror 357. The half mirror 357 sends the laser pulses to galvanomirror devices 359 and 361 with a refraction angle of 90 degrees. The galvanomirror devices 359, 361 have their operation controlled by the computer 351, and scan the HGA in X- and Y-directions thereof with the laser pulses. An objective lens 363 adjusts a focal distance so that the laser pulses that have been received from the galvanomirror devices 359, 361, take a required spot diameter on the surface of the irradiated position of the HGA.

Laser displacement gauges 365 and 367 measure a static attitude of the HGA by using the laser beams irradiated thereonto, and send data to the computer 351. An X-Y stage 369 has a fixing mechanism for the HGA and moves to a position at which the laser beams from the objective lens 363 can be irradiated onto the HGA. The HGA-fixing mechanism of the X-Y stage 369 inverts the side of the HGA that faces the objective lens 363, and thus allows laser beam irradiation to the irradiating positions A, B, C, and D described in FIGS. 3(A) and 3(B), without removing the HGA. An opto-electric transducer 355 receives the light signal reflected from the HGA surface, through the objective lens 363, the galvanomirror devices 359, 361, and the half mirror 357, converts the signal into an electric signal, and sends the electric signal to the computer 351.

The computer 351, after receiving image information of the HGA surface from the opto-electric transducer 355, calculates the unit shot positions at each irradiating position, based on a position of the head/slider or dimple, and controls the galvanomirror devices so as to position the laser beams properly in the string of beams. The computer 351 further monitors an irradiation state of the laser beams and a surface state of the HGA while correcting the attitude thereof.

FIG. 15 is a diagram that explains irradiating positions with respect to a flexure assembly of another structure. Flexure assembly 301 of FIG. 15 uses one pair of arms 305a, 305b, to support a flexure tongue 303. Irradiating positions A, B, C, and D are selected so as to be close to a position at which a vertical line 309 passing through a DCP and vertical to a longitudinal axis of the flexure assembly intersects with the arms 305a, 305b. The irradiating positions C, B are provided at the head/slider installation side, and the irradiating positions A, D are provided on those positions at the reverse side of the arms 305a, 305b, that are associated with the irradiating positions C, B. Locations, areas, quantities, and other factors of the irradiating positions set on the flexure assembly are not limited to/by the embodiment described in this specification, and can be selected with variety so as to be optimized for the particular structure of the HGA.

Figure 17:
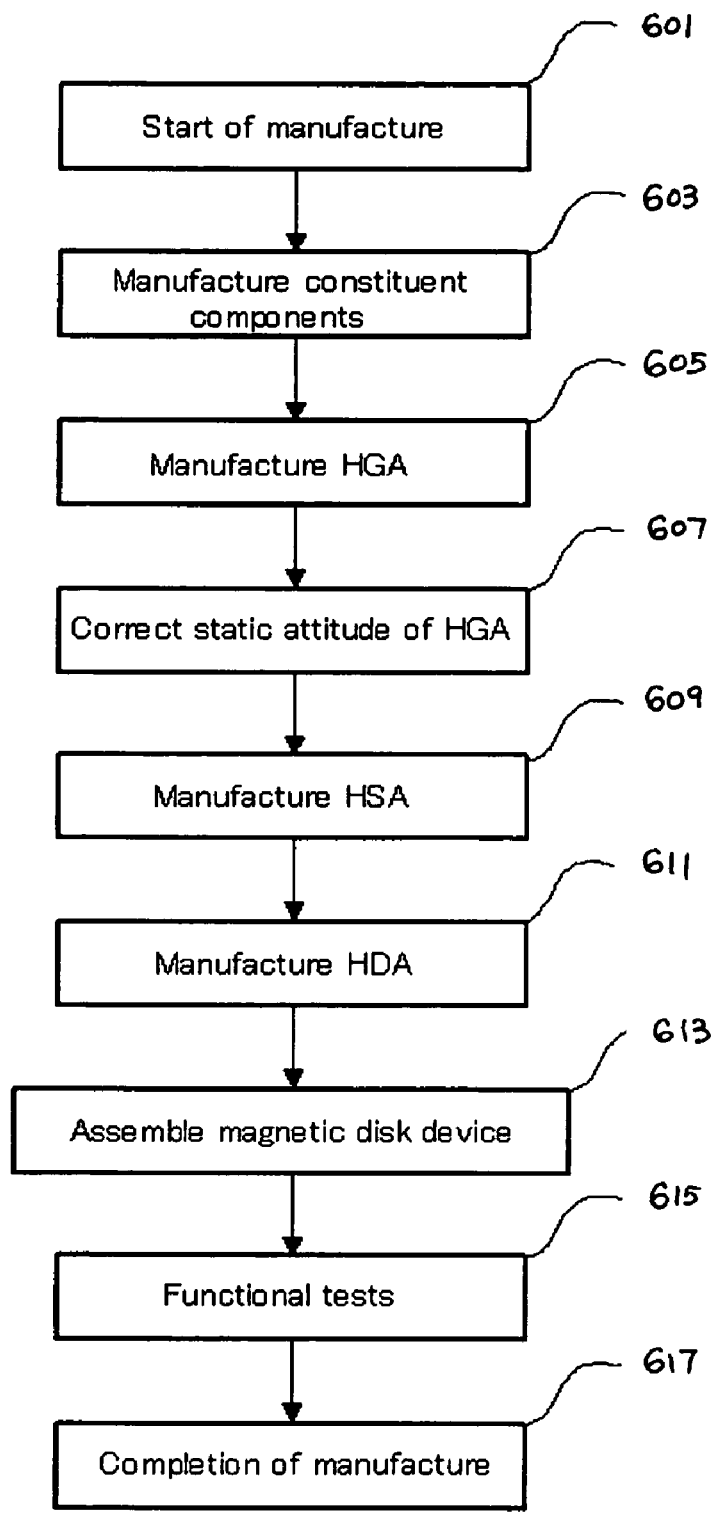
FIG. 17 is a flowchart explaining a method of manufacturing the magnetic disk of the present embodiment.

Next, a method of manufacturing the magnetic disk 10 according to the present embodiment is described below with reference to a flowchart of FIG. 17. The manufacture is started in block 601. The base 11, the magnetic disk 15, the flexure assembly 101, the head/slider 151, the load beam arm 75a and fixed portion 75b, the carriage 23, the spindle motor, the VCM, and other elements are each manufactured independently in block 603. In block 605, the head/slider 151, the flexure assembly 101, the load beam arm 75a and fixed portion 75b, and the hinge 77 are assembled and thus the HGA 100 is manufactured. In block 607, a static attitude of the HGA 100 is corrected using the above-mentioned procedure of the present embodiment.

In block 609, the HGA 100 whose static attitude has been corrected is fixed to the actuator arm of the carriage 23 by swage machining, and the HSA 13 is thus manufactured. The carriage 23 is usually provided with a plurality of HGAs, in which case, each HGA needs to have their static attitude corrections completed. In block 611, the spindle motor, the magnetic disk 15, the ramp 17, the magnet of the VCM, the HSA 13, and other elements are assembled into/onto the base 11 and then the base cover is mounted. A head disk assembly (HDA) is thus manufactured. In block 613, a circuit board with mounted semiconductor elements is installed outside the HDA, whereby the magnetic disk device 10 is manufactured. In block 615, various functional tests on writing servo data onto the magnetic disk 15, on setting head and channel parameters, and on registering defects of the magnetic disk 15, are performed, and the manufacture of the magnetic disk device 10 is completed in block 617.

While the specific embodiment shown in the accompanying drawings has heretofore been described as an example of the present invention, the invention is not limited to/by the embodiment shown in the drawings and it goes without saying that as far as advantageous effects of the invention are utilized, any existing known configuration can be adopted.

The present invention can be applied to total attitude control of the suspension in a magnetic disk device.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method of manufacturing a magnetic disk device which includes a magnetic disk, a head gimbal assembly with a mounted head/slider for accessing the magnetic disk, and a carriage rotatably supporting the head gimbal assembly, said method comprising:

providing a plurality of displacement vectors equivalent to changes in static attitude of the head gimbal assembly that occur when a unit shot of laser light is performed on each of plural irradiating positions set for the head gimbal assembly;

by forming a first vector group which constitutes a shortest path from an initial attitude of the head gimbal assembly to a first final anticipatory attitude present within permissible range of a target attitude thereof, performing a first calculation of a number of laser light shots with respect to irradiating positions related to the displacement vectors included in the first vector group;

performing a first irradiation of conducting unit shots equivalent to the number of laser light shots calculated in said first calculation, with respect to the associated irradiating positions;

if an after-shot attitude of the head gimbal assembly that was measured after said first irradiation does not fall within the permissible range of the target attitude, performing a displacement vector correction of correcting the displacement vectors included in the first vector group, on the basis of the after-shot attitude and the first final anticipatory attitude;

by forming from at least the displacement vectors corrected in said first correction, a second vector group which constitutes the shortest path from the after-shot attitude to a second final anticipatory attitude present within the permissible range of the target attitude, performing a second calculation of a number of laser light shots with respect to irradiating positions related to the displacement vectors included in the second vector group; and performing a second irradiation of conducting, with respect to the associated irradiating positions, unit shots equivalent to the number of laser light shots calculated in said second calculation.

2. The manufacturing method according to claim 1, wherein the displacement vectors are each constituted by components of a static pitch angle and a static roll angle of the head gimbal assembly.

3. The manufacturing method according to claim 2, wherein the irradiating positions are set in four places on the head gimbal assembly, and combinations of plus and minus static pitch angles and static roll angles relevant to the four displacement vectors obtained when a unit shot of laser light is performed on each of the irradiating positions are different from one another.

4. The manufacturing method according to claim 1, wherein the unit shot of laser light is a shot of the single string of laser light beams irradiated along a parallel line passing through a dimple contact point of the head gimbal assembly, the parallel line being parallel to a line vertical to a longitudinal axis of the head/slider.

5. The manufacturing method according to claim 4, wherein the shot of the single string of laser light beams is discontinuously conducted in a beam spot form.

6. The manufacturing method according to claim 1, wherein the displacement vectors are common displacement vectors representative of the plural displacement vectors measured by conducting a unit shot of laser light with respect to a plurality of head gimbal assemblies of the same structure as the structure of the head gimbal assembly.

7. The manufacturing method according to claim 1, wherein the irradiating positions are provided in two places on the face of the head gimbal assembly that points to the head/slider, and in two places on a face pointing to a load beam.

8. The manufacturing method according to claim 1, wherein a vertical line across a dimple contact point of the head gimbal assembly and vertical to a longitudinal axis of the head/slider further passes through each of the irradiating positions.

9. The manufacturing method according to claim 1, wherein the irradiating positions are provided on an arm which supports a flexure tongue of the flexure assembly constituting the head gimbal assembly.

10. The manufacturing method according to claim 1, wherein said first calculation further includes selecting, from either displacement vector included in the first vector group and the plural anticipatory attitudes obtained by synthesizing each of the displacement vectors, either displacement vector constituting the anticipatory attitude closest to the target attitude.

11. The manufacturing method according to claim 10, further comprising, by repeating said selecting from an arrival at the initial attitude to an arrival at the first final anticipatory attitude, integrating, for each of the irradiating positions, the number of displacement vectors which constituted the vector group.

12. The manufacturing method according to claim 1, wherein said first irradiation further includes conducting a plurality of unit shots along a plurality of parallel lines each passing through a dimple contact point of the head gimbal assembly, each of the parallel lines being parallel to a line vertical to a longitudinal axis of the head/slider.

13. The manufacturing method according to claim 1, wherein said displacement vector correction further includes calculating a value of a ratio of a difference between the initial attitude and the after-shot attitude, and a difference between the initial attitude and the first final anticipatory attitude.

14. A method of manufacturing a magnetic disk device which includes a magnetic disk, a head gimbal assembly with a mounted head/slider for accessing the magnetic disk, and a carriage rotatably supporting the head gimbal assembly, said method comprising:

providing a plurality of displacement vectors equivalent to changes in static attitude of the head gimbal assembly that occur when a unit shot of laser light is performed on each of plural irradiating positions set for the head gimbal assembly;

performing a first calculation of, by forming from a required number of displacement vectors provided in said step of providing displacement vectors, a first vector group which constitutes a path from an initial attitude of the head gimbal assembly to an intermediate anticipatory attitude present halfway on a shortest path heading for a target attitude of the head gimbal assembly, calculating a number of laser light shots with respect to irradiating positions related to the displacement vectors included in the first vector group;

performing a first irradiation of conducting unit shots equivalent to the number of laser light shots calculated in said first calculation, with respect to the associated irradiating positions;

performing a displacement vector correction of correcting the displacement vectors included in the first vector group, on the basis of the intermediate anticipatory attitude and an after-shot attitude measured after said first irradiation;

performing a second calculation of, by forming from at least the displacement vectors corrected in said correction step, a second vector group which constitutes a shortest path from the after-shot attitude to a final anticipatory attitude present within a permissible range of the target attitude, calculating a number of laser light shots with respect to irradiating positions related to the displacement vectors included in the second vector group; and performing a second irradiation of conducting, with respect to the associated irradiating positions, unit shots equivalent to the number of laser light shots calculated in said second calculation.

15. The manufacturing method according to claim 14, wherein said displacement vector correction further includes calculating a value of a ratio of a difference between the initial attitude and the after-shot attitude, and a difference between the initial attitude and the intermediate anticipatory attitude.

16. A method of manufacturing a magnetic disk device which includes a magnetic disk, a head gimbal assembly with a mounted head/slider for accessing the magnetic disk, and a carriage rotatably supporting the head gimbal assembly, said method comprising:

providing four displacement vectors equivalent to changes in static attitude of the head gimbal assembly that occur when a unit shot of laser light is performed on each of irradiating positions set in four places through which a vertical line across a dimple contact point of the head gimbal assembly and vertical to a longitudinal axis of the head/slider is to pass;

forming a vector group that constitutes a shortest path from an initial attitude of the head gimbal assembly to a final anticipatory attitude present within a permissible range of a target attitude of the head gimbal assembly, by selecting, from either displacement vector included in the vector group and plural anticipatory attitudes obtained by synthesizing each of the displacement vectors, either displacement vector constituting the anticipatory attitude closest to the target attitude;

integrating, for each of the irradiating positions in the four places, the number of laser light shots with respect to irradiating positions related to the displacement vectors included in the vector group; and conducting the number of unit shots integrated in said integrating step, along a plurality of parallel lines each parallel to the line vertical to the associated irradiating positions.

17. The manufacturing method according to claim 16, wherein the unit shot of laser light is a shot of the single string of laser light beams irradiated along a parallel line passing through the dimple contact point of the head gimbal assembly, the parallel line being parallel to the line vertical to the longitudinal axis of the head/slider.

18. The manufacturing method according to claim 16, wherein the irradiating positions in two of the four places are provided on a face of a support arm of a flexure tongue forming a part of the head gimbal assembly that points to the head/slider, and the irradiating positions in the remaining two of the four places are provided on a face that points to a load beam.

19. The manufacturing method according to claim 16, wherein the irradiating positions in the four places are provided on an arm that supports a flexure tongue of a flexure assembly forming a part of the head gimbal assembly.

20. The manufacturing method according to claim 16, wherein the displacement vectors are constituted by components of a static pitch angle and a static roll angle, and combinations of plus and minus static pitch angles and static roll angles of the four displacement vectors are different from one another.

* * * * *